United States Patent
Natori et al.

(10) Patent No.: US 9,639,264 B2
(45) Date of Patent: May 2, 2017

(54) IMAGE PROJECTOR DEVICE

(71) Applicant: SEIKO EPSON CORPORATION, Tokyo (JP)

(72) Inventors: Takashi Natori, Suwa (JP); Koichiro Ota, Omachi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 105 days.

(21) Appl. No.: 14/799,948

(22) Filed: Jul. 15, 2015

(65) Prior Publication Data

US 2015/0317074 A1 Nov. 5, 2015

Related U.S. Application Data

(63) Continuation of application No. 13/712,294, filed on Dec. 12, 2012.

(30) Foreign Application Priority Data

| May 7, 2012 | (JP) | 2012-105754 |
| May 9, 2012 | (JP) | 2012-107608 |
| May 10, 2012 | (JP) | 2012-108558 |

(51) Int. Cl.
*G06F 3/033* (2013.01)
*G03B 21/14* (2006.01)
(Continued)

(52) U.S. Cl.
CPC .......... *G06F 3/04883* (2013.01); *G06F 3/011* (2013.01); *G06F 3/017* (2013.01);
(Continued)

(58) Field of Classification Search
CPC .... G06F 3/04883; G06F 3/0488; G06F 3/011; G06F 3/017; G06F 3/0304; G06F 3/0421; G06F 3/0484; G06K 9/00335
See application file for complete search history.

(56) References Cited

U.S. PATENT DOCUMENTS

| 7,524,066 B2 | 4/2009 | Sato |
| 2009/0315740 A1* | 12/2009 | Hildreth .................. G06F 3/017 341/20 |

(Continued)

FOREIGN PATENT DOCUMENTS

| JP | 2004-239967 A | 8/2004 |
| JP | 2006-171488 A | 6/2006 |

(Continued)

OTHER PUBLICATIONS

Apr. 24, 2015 Notice of Allownace issued in U.S. Appl. No. 13/712,294.

(Continued)

*Primary Examiner* — William C Dowling
(74) *Attorney, Agent, or Firm* — Oliff PLC

(57) ABSTRACT

An image projector device includes a projection optical unit through which an image is projected and displayed, a recognition unit that recognizes a user's action related to processing of the image, and a control unit that generates and/or edits a drawing image based on the user's action recognized by the recognition unit and projects and displays the drawing image being generated and/or edited as a projected, displayed image through the projection optical unit.

14 Claims, 24 Drawing Sheets

(51) Int. Cl.

| | | |
|---|---|---|
| *G06F 3/0484* | (2013.01) | |
| *G06F 3/0488* | (2013.01) | |
| *G06F 3/01* | (2006.01) | |
| *G06F 3/03* | (2006.01) | |
| *B43L 1/00* | (2006.01) | |
| *G06F 3/042* | (2006.01) | |
| *G06K 9/00* | (2006.01) | |
| *G03B 21/10* | (2006.01) | |

(52) U.S. Cl.
CPC .......... *G06F 3/0304* (2013.01); *G06F 3/0421* (2013.01); *G06F 3/0484* (2013.01); *G06K 9/00335* (2013.01); *B43L 1/004* (2013.01); *G03B 21/10* (2013.01); *G03B 21/14* (2013.01); *G03B 2206/00* (2013.01); *G06F 2203/04808* (2013.01)

(56) References Cited

U.S. PATENT DOCUMENTS

| | | |
|---|---|---|
| 2010/0149206 A1 | 6/2010 | Shigehisa et al. |
| 2010/0253621 A1 | 10/2010 | Suzuki et al. |
| 2012/0050302 A1 | 3/2012 | Dedeoglu et al. |
| 2012/0229425 A1 | 9/2012 | Barrus et al. |
| 2012/0229470 A1 | 9/2012 | Nagai |
| 2012/0233553 A1 | 9/2012 | Barrus |
| 2012/0280948 A1 | 11/2012 | Barrus et al. |
| 2013/0135263 A1 | 5/2013 | Omura |
| 2014/0218300 A1* | 8/2014 | Muraki ............... G03B 17/54 345/168 |
| 2015/0301625 A1 | 10/2015 | Suzuki et al. |
| 2015/0346848 A1 | 12/2015 | Omura |
| 2016/0188001 A1 | 6/2016 | Suzuki et al. |

FOREIGN PATENT DOCUMENTS

| | | |
|---|---|---|
| JP | 2006-174053 A | 6/2006 |
| JP | 2007-325008 A | 12/2007 |
| JP | 2008-102244 A | 5/2008 |
| JP | 2008-112077 A | 5/2008 |
| JP | 2010-015032 A | 1/2010 |
| JP | 2010-072427 A | 4/2010 |
| JP | 2010-170023 A | 8/2010 |
| JP | 2010-245796 A | 10/2010 |
| JP | 2011-090486 A | 5/2011 |
| JP | 2011-203830 A | 10/2011 |
| JP | 2013-137736 A | 7/2013 |

OTHER PUBLICATIONS

Feb. 6, 2015 Office Action issued in U.S. Appl. No. 13/712,294.
User's Guide EPSON® PowerLite® 8150i Multimedia Projector, 2001, published by Epson America, Inc.

* cited by examiner

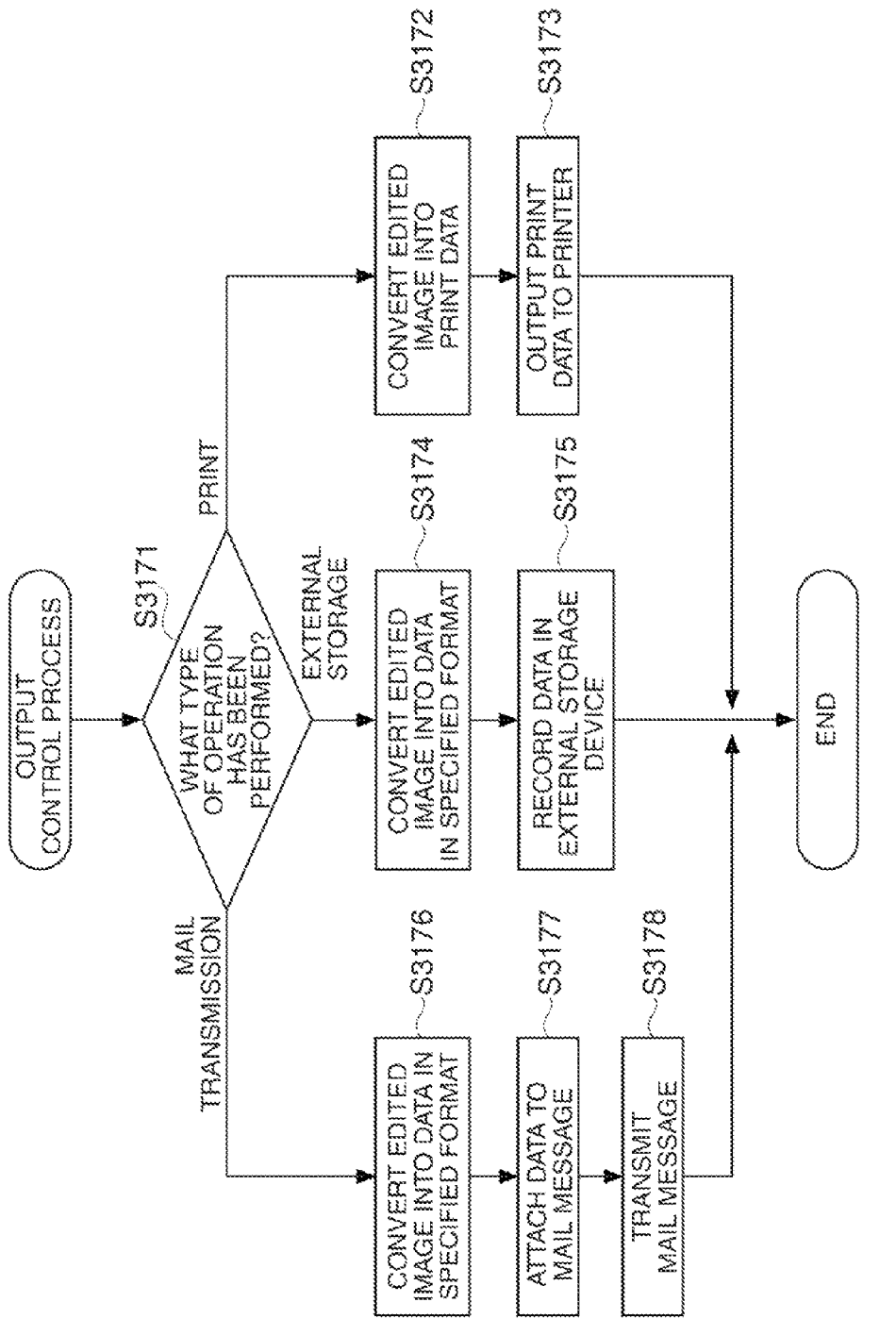

IMAGE PROJECTOR DEVICE

CROSS-REFERENCE TO RELATED APPLICATION

This is a continuation application of application Ser. No. 13/712,294 filed Dec. 12, 2012 which claims priority from Japanese applications JP2012-105754A filed on May 7, 2012, JP2012-107608A filed on May 9, 2012 and JP2012-108558A filed on May 10, 2012, the content of which is hereby incorporated by reference into this application.

BACKGROUND

1. Field of the Invention

The present invention relates to a technology of an image projector device.

2. Description of the Related Art

In a conference or a discussion made by a plurality of persons, the participants usually create drawings with a pen on a whiteboard to stimulate the discussion. A drawing created on the whiteboard is read with a camera or a scanner provided as an integrated part of the whiteboard, and the drawing image is saved by printing it with a printer, saving the drawing image in a memory, or otherwise processing the drawing image. In recent years, a drawing capturing capability of a camera, a sensor, or any other device is used with a projector and application software having a whiteboard capability is run on a PC (personal computer) to allow the projector to work as a whiteboard as well (JP-A-2004-239967, for example).

However, to allow a projector to work as a whiteboard as well, it is always necessary to prepare a PC, which disadvantageously requires time and effort. Further, when a plurality of persons bring PCs with them and create various drawings on the respective PCs, it is necessary to switch the connection between the projector and the PCs whenever a drawing is created on any of the PCs, and application software having a whiteboard capability needs to be installed in each of the PCs. Moreover, an image of a drawing created on each of the PCs is saved in the PC used to create the drawing, but the image of the drawing created on each of the PCs cannot be so saved that the participants can share the image. To allow the participants to share an image of a drawing created on each of the PCs, drawing data need to be distributed or otherwise undergo cumbersome processes. The invention has been made in order to solve the existing problems described above, and an object of the invention is to achieve a capability required in a conference using a whiteboard capability by using a projector alone.

SUMMARY

The invention has been made to solve at least a part of the problems described above, and the invention can be implemented as the following aspects.

According to an aspect of the invention, an image projector device is provided. The image projector device includes a projection optical unit, a storage unit, a control unit, and an enclosure that accommodates the projection optical unit, the storage unit, and the control unit. The projection optical unit can project and display an image. The storage unit stores an image in a readable manner. The control unit can project and display the stored image through the projection optical unit in accordance with user's selection. According to the thus configured image projector device, since a function of storing a projected, displayed image is provided in the enclosure of the image projector device, it is not necessary to separately prepare another device that stores an image in a readable manner.

The image projector device described above may be configured to further include a recognition unit. The recognition unit can recognize a user's action related to processing of an image. In this case, the control may generate and/or edit a drawing image based on the user's action recognized by the recognition unit and project and display an edited image containing the drawing image being generated and/or edited as a projected, displayed image through the projection optical unit. Further, the storage unit may store the edited image used as the projected, displayed image.

Alternatively, in the image projector device described above, the control unit may generate and/or edit a drawing image based on the user's action recognized by the recognition unit, superimpose the drawing image on a base image that is a background image of the drawing image to generate an edited image, and project and display the edited image as a projected, displayed image through the projection optical unit. Further, the storage unit may store the edited image used as the projected, displayed image.

According to another aspect of the invention, the image projector device may further include an input unit, an image storage unit, and a display control unit. The input unit may receive an externally inputted image. The image storage unit may store the inputted image. The display control unit may project and display a displayed image containing the following areas through the projection optical unit: a candidate image display area where the stored one or more images are displayed in user-selectable forms; and an edited image area where the selected image is displayed.

All the plurality of elements provided in the aspects of the invention described above are not essential. To achieve part or all of advantageous effects described herein, part of the plurality of elements described above can be changed, deleted, replaced with new other elements, and partially deleted in a limited manner as appropriate. Further, to achieve part or all of the advantageous effects described herein, part or all of the technical features contained in an aspect of the invention described above can be combined with part or all of the technical features contained in another aspect of the invention described above to provide an independent aspect of the invention.

The invention can be implemented in a variety of other aspects. For example, the invention can be implemented in the form of an electronic blackboard apparatus, an electronic blackboard system, a conference apparatus, a conference system, an image projection and display method, an image projection and display program product, and other aspects.

BRIEF DESCRIPTION OF THE DRAWINGS

FIG. 24 is a flowchart showing the procedure of an output control process in the third embodiment.

DESCRIPTION OF EXEMPLARY EMBODIMENTS

A. First Embodiment

(A1) System Configuration

Figure 1:
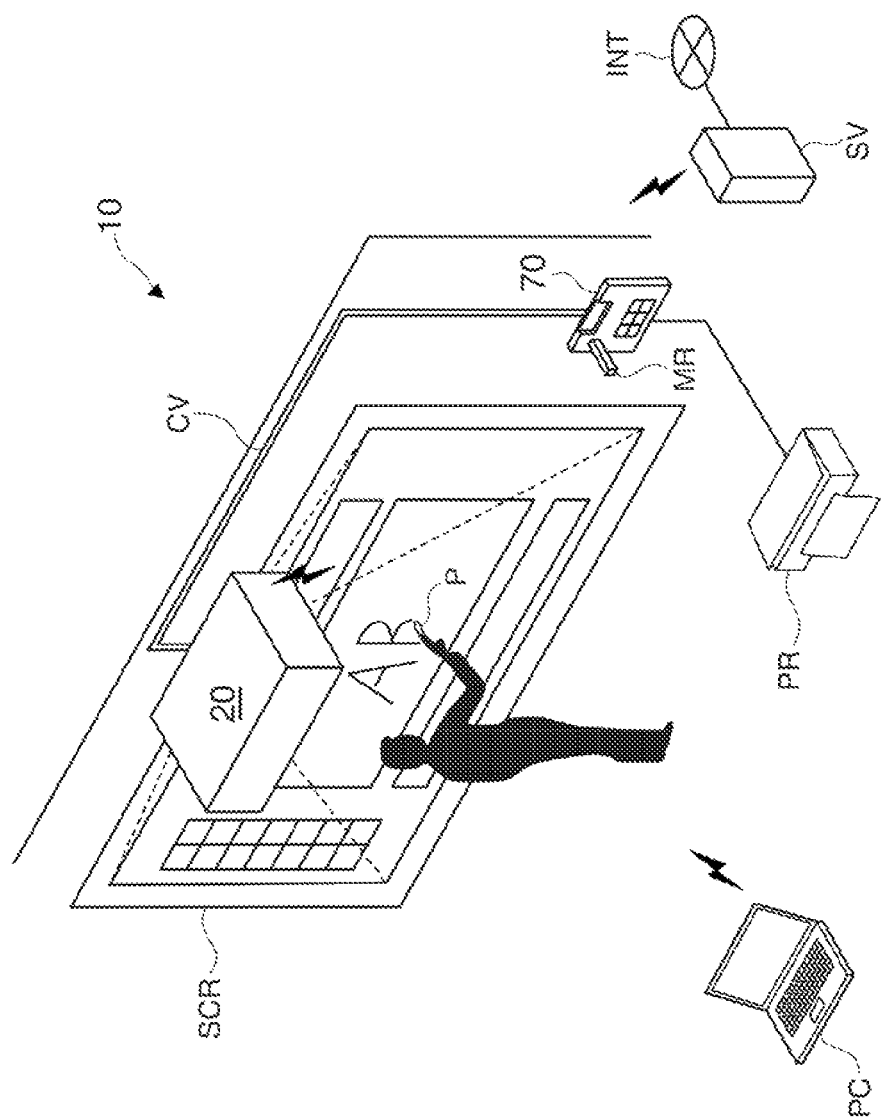
FIG. 1 is a descriptive diagram for describing the configuration of an image projector system.

FIG. 1 is a descriptive diagram for describing the configuration of an image projector system 10 using a projector 20 as a first embodiment of the invention. The image projector system 10 includes the projector 20, an operation panel 70 through which the projector 20 is operated, a computer PC, a printer PR, and a server SV. The projector 20 and the operation panel 70 are connected to each other with a dedicated cable CV. The printer PR is connected to the projector 20 via the operation panel 70. Further, a flash memory MR as an external storage device is connected to the operation panel 70. The projector 20 receives data from the flash memory MR and outputs data to the flash memory MR via the operation panel 70. Each of the computer PC and the server SV is connected to the projector 20 via a wireless LAN (not shown). The server SV is connected to the Internet INT or any other external network, and the projector 20 can be connected to INT via the server SV.

The projector 20 is a wall-mounted, short-focal-length projector and projects and displays an image on a screen SCR installed in a short distance from the projector 20. An image projected and displayed by the projector 20 is hereinafter also referred to as a displayed image. The projector 20 has a capability of a typical projector that projects and displays externally inputted motion images or still images as displayed images. The action mode of the projector 20 that performs the typical capability is hereinafter also referred to as a normal mode (NML mode). Further, the projector 20 has a capability of what is called an electronic blackboard that recognizes a drawing action performed by a user on the screen SCR, and the projector 20 then projects and displays a drawing image corresponding to the drawing action as a displayed image on the screen SCR. The action mode of the projector 20 that performs the electronic blackboard capability is hereinafter referred to as a whiteboard mode (WE mode). The projector 20 acting in the WB mode uses a camera 54, which will be described later, to recognize an action performed on the screen SCR (hereinafter also referred to as drawing action) by the user who uses a pen emitting infrared light from the tip thereof (hereinafter also referred to as infrared light pen P) and projects and displays a drawing image corresponding to the drawing action on the screen SCR.

Figure 2:
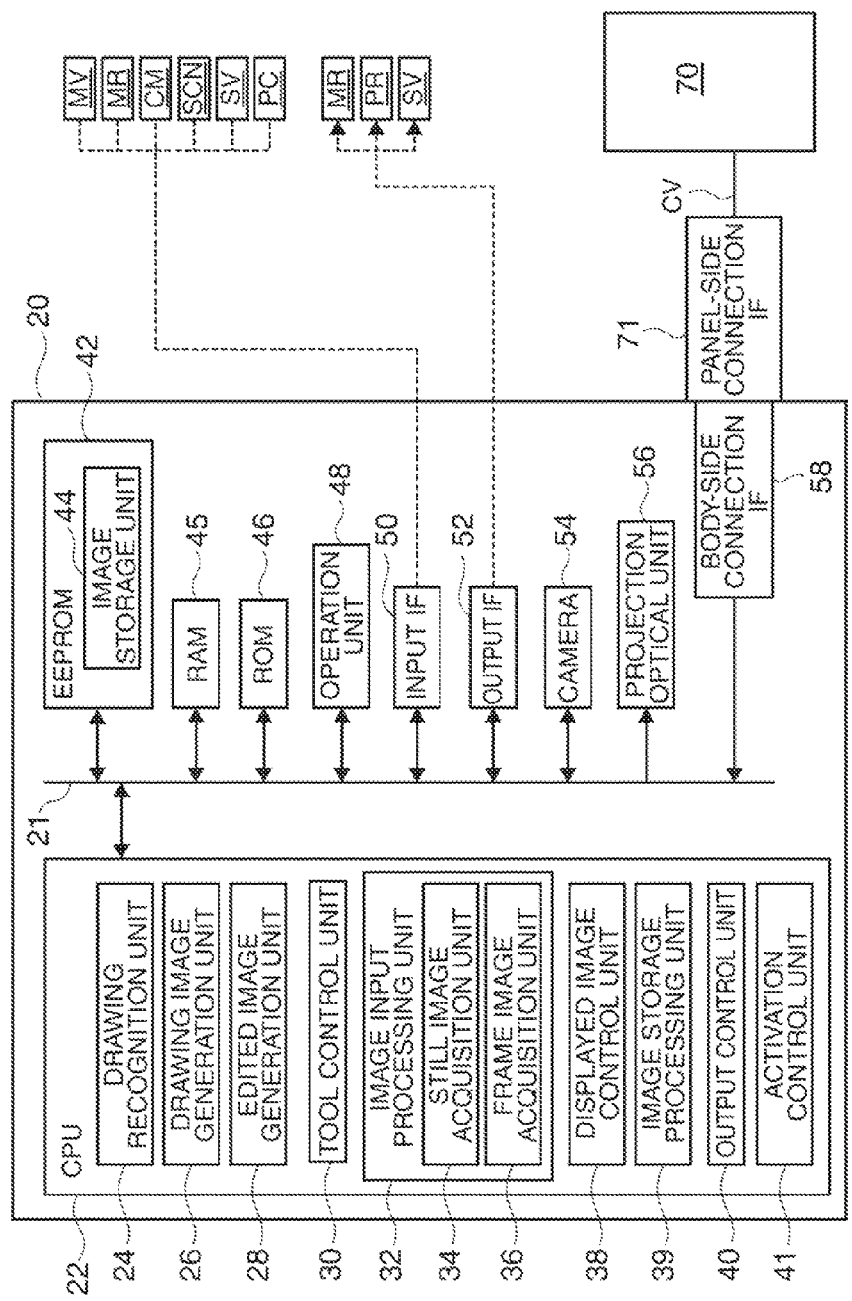
FIG. 2 is a block diagram for schematically describing the configuration of a projector.

FIG. 2 is a block diagram for schematically describing the configuration of the projector 20. The projector 20 includes a CPU 22, an EEPROM 42, a RAM 45, a ROM 46, an operation unit 48, an input interface (input IF) 50, an output interface (output IF) 52, a camera 54, a projection optical unit 56, and a body-side connection interface (body-side connection IF) 58. The elements described above are connected to each other via a bus 21.

The CPU 22, which controls the action of the entire projector 20, includes a drawing recognition unit 24, a drawing image generation unit 26, an edited image generation unit 28, a tool control unit 30, an image input processing unit 32, a displayed image control unit 38, an image storage processing unit 39, an output control unit 40, and an activation control unit 41. Further, the image input processing unit 32 includes a still image acquisition unit 34 and a frame image acquisition unit 36. The functional units described above provided in the CPU 22 are achieved by the CPU 22 that reads a program stored in the ROM 46 and executes the program. The functional units will be described later in detail.

The EEPROM 42 includes an image storage unit 44 and stores an image as required when the CPU 22 acts as any of the functional units described above. The operation unit 48 includes operation mechanisms used when the user operates the projector 20, such as a switch that powers the projector 20 on and off and a switch that switches an input source to another.

The input IF 50 includes a plurality of input mechanisms through which image data outputted from the following devices are inputted: a motion image data reproduction device MV (DVD, for example), the flash memory MR, a digital camera CM, a scanner SCN, the server SV, the computer PC, and other data output devices. The output IF 52 includes a plurality of other output mechanisms through which image data are outputted toward the flash memory MR, the printer PR, the server SV, and other data reception devices including data reception mechanisms. The input IF 50 and the output IF 52 are shown as separate elements for ease of description, but a single connection interface capable of sending and receiving data in a bidirectional manner, such as a USB terminal and a LAN connection terminal, functions as both the input IF 50 and the output IF 52. The connection of the input IF 50 and the output IF 52 with the computer PC, the server SV, and other devices is not limited to wired connection but may be wireless connection. The wireless connection can be established based on wireless LAN, Bluetooth®, infrared communication, and other wireless communication technologies.

The camera 54 captures images of the screen SCR and a portion in the vicinity thereof at predetermined intervals to sense the infrared light emitted from the infrared light pen P used by the user to perform a drawing action. Based on the path of the sensed infrared light, the CPU 22 acquires coordinate information by using the function of the drawing recognition unit 24 and generates a drawing image corresponding to the drawing action by using the function of the drawing image generation unit 26. Alternatively, a dedicated board that functions as the screen SCR may be used to recognize a user's drawing action. Specifically, a dedicated board having a touch panel capability may be connected to the projector 20, and the drawing recognition unit 24 may acquire coordinate information corresponding to a drawing action performed by the user on the dedicated board. The drawing image generation unit 26 may then generate a drawing image based on the acquired coordinate information.

The projection optical unit 56 includes a light source, a light separator that separates light from the source light into RGB light sources, a liquid crystal panel that modulates light fluxes from the RGB light sources to form an image to be displayed, and a plurality of lenses that focus the light fluxes modulated by the liquid crystal panel on the screen SCR to form the displayed image (none of the elements described above is shown). A digital micro-mirror device (DMD) may alternatively be used as the mechanism that modulates the light fluxes from the RGB light sources.

The body-side connection IF 58 is a connection interface used to connect the projector 20 to the operation panel 70. The operation panel 70 includes the cable CV and a panel-side connection IF 71 used to connect the operation panel 70 to the projector 20. When the body-side connection IF 58 and the panel-side connection IF 71 are connected to each other, the projector 20 and the operation panel 70 are connected to each other for data transmission and reception.

Figure 3:
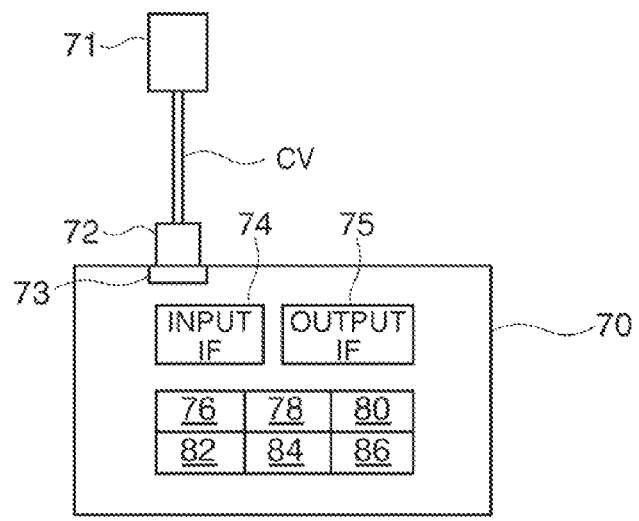
FIG. 3 is a descriptive diagram for describing the configuration of an operation panel.

FIG. 3 is a descriptive diagram for describing the configuration of the operation panel 70. The operation panel 70 includes the panel-side connection IF 71, the cable CV, a connection terminal 72, a connection terminal 73, an input IF 74, an output IF 75, an NML mode activation button 76, a WB mode activation button 78, an input source detection button 80, a capture button 82, a print button 84, and a save button 86. The panel-side connection IF 71 is a connector to be connected to the body-side connection IF 58 of the projector 20, as described above. The connection terminal 72 and the connection terminal 73 are connectors that allow the cable CV to be attached to and detached from the body of the operation panel 70. The separable connection configuration between the body-side connection IF 58 and the panel-side connection IF 71 or between the connection terminal 72 and the connection terminal 73 allows the user to carry the operation panel 70 separately from the projector 20.

The input IF 74 has the same function as that of the input IF 50, which has been described with reference to FIG. 2. Similarly, the output IF 75 has the same function as that of the output IF 52 (FIG. 2). Data inputted via the input IF 74 and data outputted via the output IF 75 are received from and sent to the projector 20 via the cable CV and the panel-side connection IF 71. The NML mode activation button 76 is a button used to activate the projector 20, and the projector 20 starts the NML mode when sensing that the NML mode activation button 76 is turned "ON." The WB mode activation button 78 is also a button used to activate the projector 20, and the projector 20 starts the WB mode when sensing that the WB mode activation button 78 is turned "ON." The user can power off the projector 20 by operating the NML mode activation button 76 to turn "OFF" the power either in the case where the NML mode has started or the case where the WB mode has started.

The input source detection button 80 is an operation button that instructs the projector 20 to carry out a process of searching for a data source (input source) that can be inputted from a data output device connected to the input IF 50 and the output IF 74. The capture button 82 is an operation button used when the projector 20 acquires motion image data from the motion image data reproduction device MV and projects and displays motion images to acquire a single-frame still image from the motion images. The print button 84 is an operation button that instructs the printer PR to print a displayed image being projected and displayed or an image stored in the image storage unit 44. The save button 86 is an operation button used to save a displayed image being projected and displayed as image data. When the user operates any of the operation buttons, a signal corresponding to the operation is inputted to the projector 20 via the cable CV and the panel-side connection IF 71. The CPU 22 in the projector 20 then acts in accordance with the received signal.

(A2) Action of Projector 20

Figure 4:
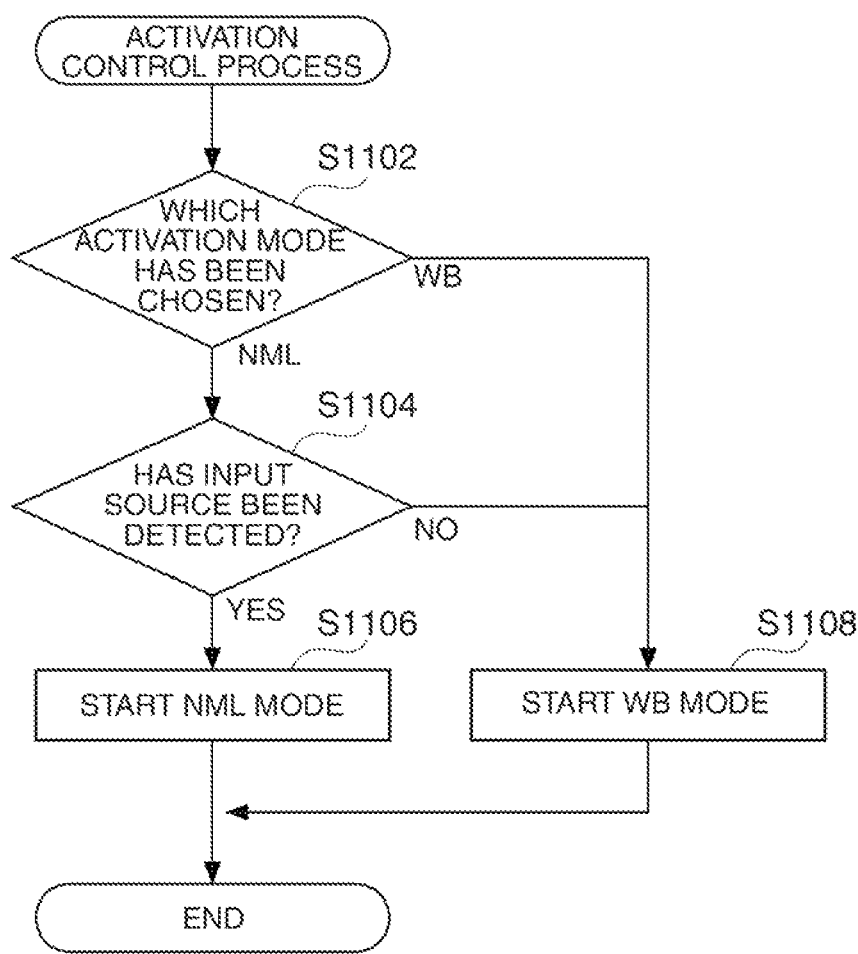
FIG. 4 is a flowchart for describing the procedure of an activation control process.

The action of the projector 20 will next be described. FIG. 4 is a flowchart for describing the procedure of an activation control process carried out by the CPU 22 as the function of the activation control unit 41 when the user operates the NML mode activation button 76 or the WB mode activation button 78 to activate the projector 20. The activation control process is initiated when the user operates the NML mode activation button 76 or the WB mode activation button 78. After the activation control process is initiated, the CPU 22 determines whether the activation button that the user has operated is the NML mode activation button 76 or the WB mode activation button 78 (step S1102). When the activation button that the user has operated is the NML mode activation button 76 (step S1102: NML), the CPU 22 accesses devices connected to the input IF 50 or the input IF 74 one by one and searches for an input source (step S1104). When an input source is detected as a result of the search (step S1104: YES), the CPU 22 starts the NML mode (step S1106) and then terminates the activation control process.

When the projector 20 is activated in the NML mode, the CPU 22 generates an image to be displayed based on data inputted from the detected input source and projects and displays the image on the screen SCR. On the other hand, when the button that the user has operated is the WB mode activation button 78 in step S1102 (step S1102: WB) or no input source is detected in step S1104 (step S1104: NO), the CPU 22 starts the WB mode (step S1108) and then terminates the activation control process.

Figure 5:
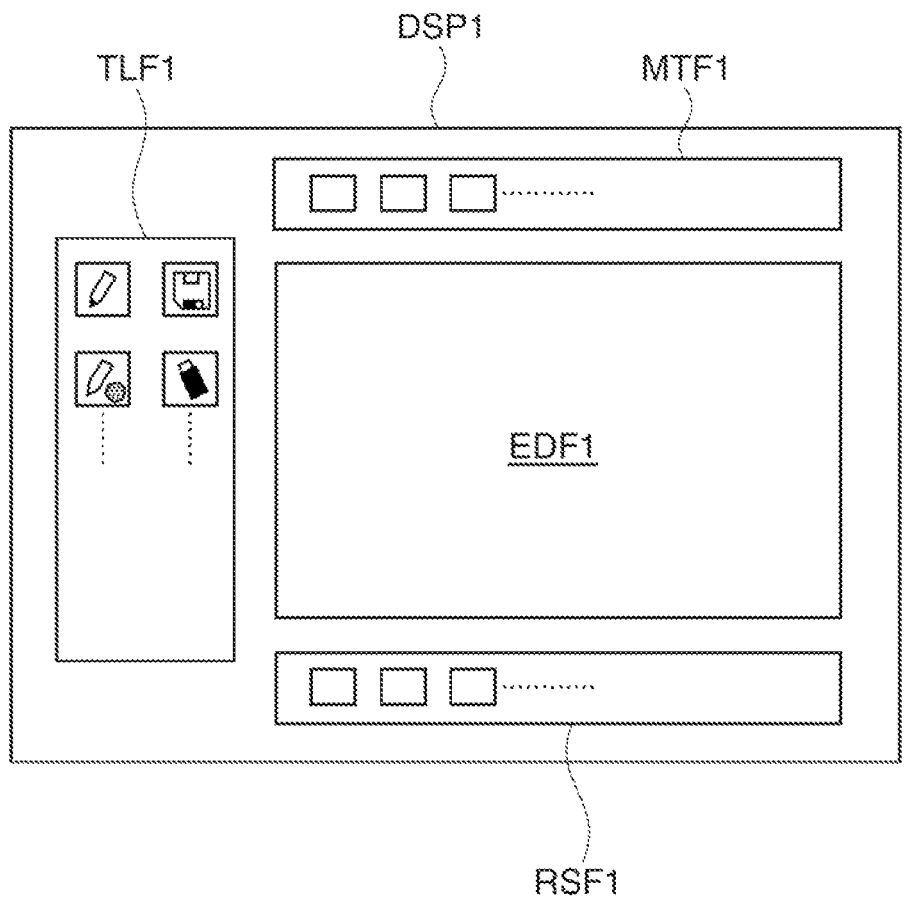
FIG. 5 is a descriptive diagram showing a WB displayed image.

The action of the projector 20 in the WB mode will next be described. FIG. 5 is a descriptive diagram showing a displayed image projected and displayed by the projector 20 on the screen SCR when the projector 20 is activated in the WB mode (hereinafter also referred to as WB displayed image DSP1). General action of the projector 20 in the WE mode will be described with reference to FIG. 5, and then processes carried out in the WB mode will be described in detail with reference to a flowchart. The WB displayed image DSP1 is formed of an edited image area EDF1, a material image display area MTF1, a drawn image area RSF1, and a tool display area TLF1, as shown in FIG. 5.

The edited image area EDF1 is an area where an image being drawn or edited by the user (hereinafter also referred to as edited image) is displayed. When the user performs a drawing action with the infrared light pen P on the edited image area EDF1 projected and displayed on the screen SCR, the CPU 22 carries out an edited image generation process, which will be described later, and displays a drawing image corresponding to the drawing action in the edited image area EDF1. When the WB mode starts, a white-colored image (white image) is displayed as a background image in the edited image area EDF1. When the user has set no other image in the edited image area EDF1, the projector 20 superimposes the drawing image on the white edited image area EDF1. The background image displayed in the edited image area EDF1 is hereinafter also referred to as a "base image." A base image is not necessarily a white image and can be a black image, a yellow image, an externally acquired graphic image or photographic image, or any other arbitrary image.

The material image display area MTF1 is an area where material images that are externally acquired and can be used as part of the edited image are displayed in the form of thumbnails. When the user who is performing drawing or editing selects one of the material images displayed in the form of thumbnails in the material image display area MTF1 with the infrared light pen P, the material image corresponding to the selected thumbnail is inserted in the edited image area EDF1. The user can use the inserted material image as part of the edited image.

The drawn image area RSF1 is an area where images having been drawn and edited by the user (hereinafter also referred to as drawn images) and saved in the image storage unit 44 are displayed in the form of thumbnails. When the user selects a thumbnail image from those displayed in the drawn image area RSF1 with the infrared light pen P, the drawn image corresponding to the selected thumbnail image is displayed in the edited image area EDF1 and the user is allowed to edit the edited image again.

The tool display area TLF1 is an area where icons corresponding to edit functions (hereinafter also referred to as tools) used by the user who is performing drawing and editing are displayed in the user-selectable forms. Examples of the displayed icons representing tools are as follows: an icon that allows the user to select the type of line drawing that forms a drawing image, such as "pen" and "brush"; an icon that allows the user to select the color of a line drawing; icons that represent figures stored in advance in the image storage unit 44 and can be inserted in an edited image, such as a circle, a triangle, and a rectangle; an icon that represents an eraser function for deleting a line drawing created in a drawing action; and icons that represent tools provided by typical application software having drawing and editing capabilities.

Further, the following icons representing tools are displayed in the tool display area TLF1: a mail transmission icon representing a function of transmitting an edited image attached to a mail message; a save icon representing a function of storing an edited image displayed in the edited image area EDF1 in the image storage unit 44; an external storage icon representing a function of storing an edited image in an external storage device connected to the projector 20; and a print icon representing a function of printing an edited image. When the user who is performing drawing or editing selects one of the variety of icons displayed in the tool display area TLF1 with the infrared light pen P, the tool function corresponding to the selected icon is activated.

Figure 6:
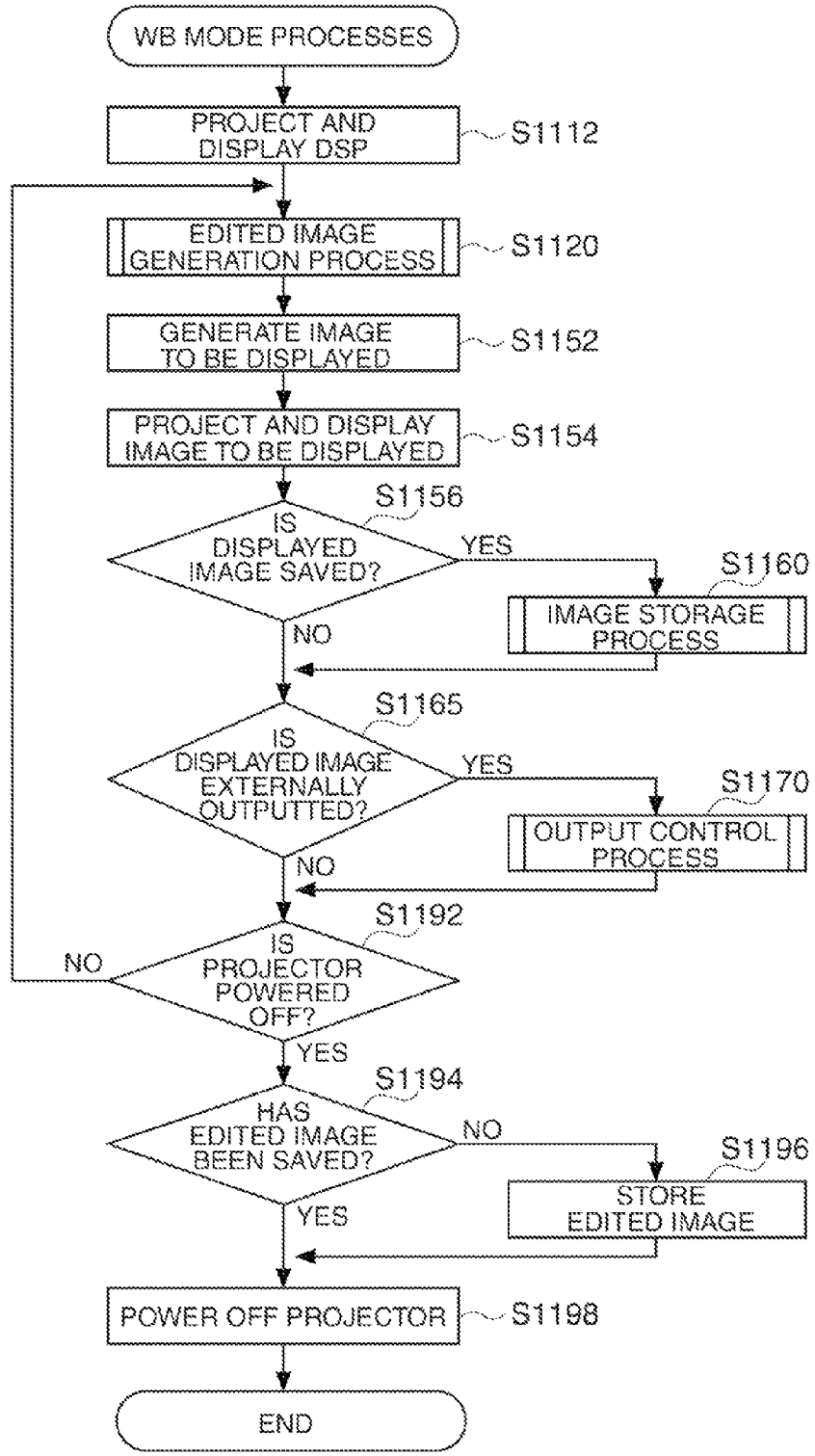
FIG. 6 is a flowchart showing the procedure of WB mode processes.

Processes carried out by the CPU 22 in the WB mode (hereinafter referred to as WE mode processes) will next be described with reference to a flowchart. FIG. 6 is a flowchart showing the procedure of the WB mode processes carried out by the CPU 22. The WB mode processes are initiated when the WB mode starts (step S1108 in FIG. 4) in the activation control process (FIG. 4). When the CPU 22 initiates the WE mode, the WB displayed image DSP1 (FIG. 5) is projected and displayed on the screen SCR via the projection optical unit 56 (step S112). Having started the WB mode, the CPU 22 sets a white image as the base image in the edited image area EDF1 in the WB displayed image DSP1, as described above. Images used as the base image are stored in the image storage unit 44, and the CPU 22 reads one of the images from the image storage unit 44 and sets the read image in the edited image area EDF1.

The CPU 22 then carries out an edited image generation process as the function of the edited image generation unit 28 (step S1120). The edited image generation process is a process in which the CPU 22 generates an edited image based on drawing and editing actions performed by the user by using the infrared light pen P on the edited image area EDF1 in the WB displayed image DSP1 having been projected and displayed. The edited image generation process will be described later in detail.

After the edited image generation process, the CPU 22 generates an image to be displayed based on the generated edited image (step S1152). Specifically, the CPU 22 generates a WE displayed image DSP1 in which the generated edited image is displayed in the edited image area EDF1. The CPU 22 then uses the generated WB displayed image DSP1 as an image to be displayed. Having generated the image to be displayed, the CPU 22 projects and displays the generated image to be displayed on the screen SCR (step S1154).

Thereafter, when the user operates the save button 86 (see FIG. 3) or the save icon as a tool (step S1156: YES), the CPU 22 carries out an image storage process as the function of the image storage processing unit 39 (step S1160). The image storage process will be described later.

Further, when the user operates the print button 84, or the mail transmission icon or the external storage icon as tools (step S1165: YES), the CPU 22 carries out an output control process of outputting data out of the projector 20 as the function of the output control unit 40 (step S1170). The output control process will be described later.

The CPU 22 repeatedly carries out the processes in steps S1120 to S1170 until the user operates the NML mode activation button 76 to power off the projector (step S1192: NO). When the user operates the NML mode activation button 76 to power off the projector (step S1192: YES), the CPU 22 checks whether or not the edited image being edited and displayed in the edited image area EDF1 has been saved in step S1156 (step S1194). When the edited image being edited has not been saved (step S1194: NO), the CPU 22 stores the edited image in a re-editable format in the image storage unit 44 (step S1196). The CPU 22 then powers off the projector 20 (step S1198) and terminates the WE mode process.

Figure 7:
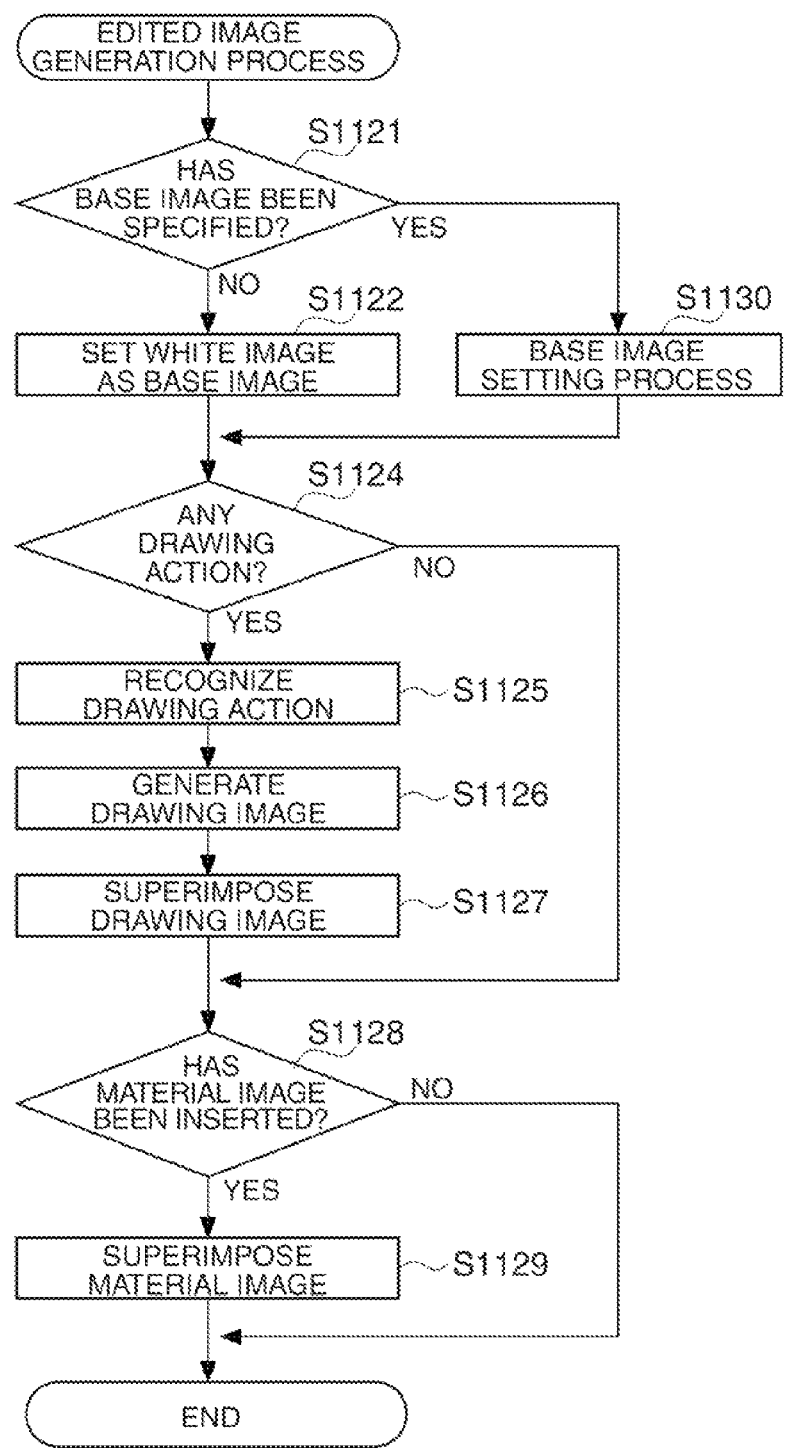
FIG. 7 is a flowchart showing the procedure of an edited image generation process.

The edited image generation process (step S1120 in FIG. 6) carried out by the CPU 22 will next be described. FIG. 7 is a flowchart showing the procedure of the edited image generation process carried out by the CPU 22. Having initiated the edited image generation process, the CPU 22 checks if the user has specified the base image (step S1121). Specifying the base image means that the user specifies an input source containing an image to be displayed in the edited image area EDF1 among input source devices connected to the projector via the input IF 50 or the input IF 74. When the user has not specified the base image (step S1121: NO), the CPU 22 sets a white image as the base image.

On the other hand, when the user has specified the base image (step S1121: YES), the CPU 22 carries out a base image setting process (step S1130). The base image setting process is a process of acquiring an image from the input source specified by the user among the input source devices connected to the projector via the input IF 50 or the input IF 74 and setting the acquired image to be the base image. The base image setting process will be described later in detail.

After the base image is set, the camera 54 detects the infrared light emitted from the infrared light pen P and the CPU 22 determines whether or not the user is performing a drawing action (step S1124) based on a result of the detection. When the CPU 22 determines that the user is performing a drawing action (step S1124: YES), the CPU 22 recognizes the drawing action being performed by the user (step S1125). Specifically, the CPU 22 controls the camera 54 to capture images of the screen SCR and a portion in the vicinity thereof at predetermined intervals. The CPU 22 recognizes the path of the infrared light emitted from the infrared light pen P based on the captured images and converts the recognized path into coordinate data.

Having recognized the drawing action, the CPU 22 generates a drawing image as the function of the drawing image generation unit 26 based on the recognized drawing action (step S1126). Specifically, a line drawing is created based on the coordinate data produced from the path of the infrared light emitted from the infrared light pen P. In this process, when the user has selected a predetermined tool function in advance, a line drawing according to the tool function is created. For example, when the brush has been selected as the type of line drawing and red has been selected as the color of the line drawing, the CPU 22 generates a drawing image formed of a red line drawing drawn with the brush as the function of the tool control unit 30. Having generated the drawing image, the CPU 22 superimposes the drawing image on the base image having been set (step S1127).

The CPU 22 then checks whether or not the user has inserted a material image in the edited image (step S1128). Specifically, the CPU 22 checks if the user has selected a material from those displayed in the form of thumbnails in the material image display area MTF1 with the infrared light pen. P. When the user has selected a material image (step S1128: YES), the CPU 22 reads the material image selected by the user from the material images stored in the image storage unit 44 in advance and superimposes the material image on the image generated in the processes through step S128 (image generated by superimposing drawing image on base image when "YES" in step S1124, whereas base image when "NO" in step S1124) to generate an edited image (step S1129). The CPU 22 then terminates the edited image generation process.

On the other hand, when the user has selected no material image (step S1129: NO), the CPU 22 sets the image generated in the processes through step S128 to be an edited image and terminates the edited image generation process. It is noted that the material images stored in the image storage unit 44 are images acquired by the CPU 22 in advance from an input source connected to the projector via the input IF 50 or the input IF 74 in order to use the images as material images and stored by the CPU 22 in the image storage unit 44. The CPU 22 stores the material images in the image storage unit 44 in response to a user's instruction. The CPU 22 thus carries out the edited image generation process.

Figure 8:
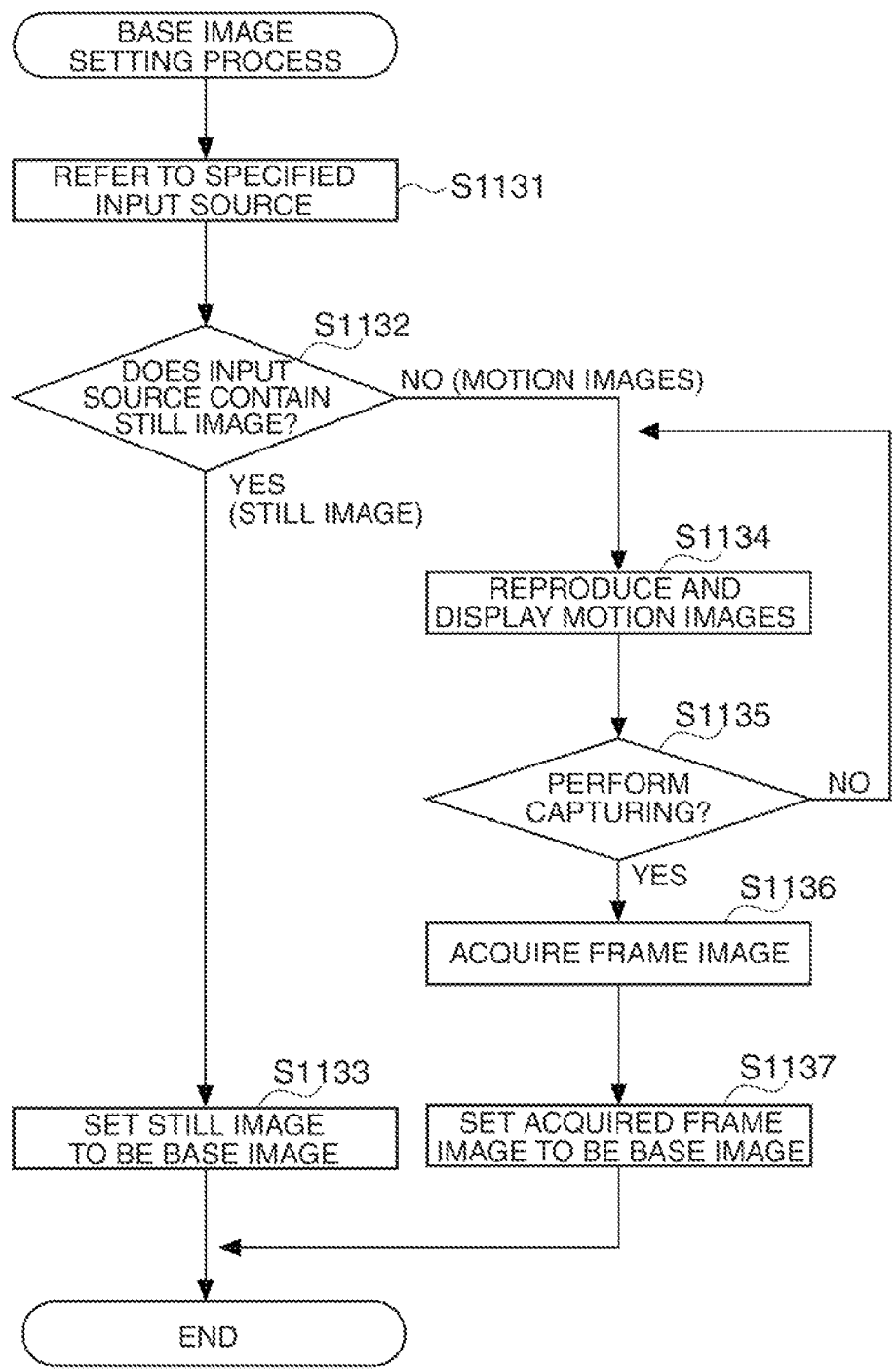
FIG. 8 is a flowchart showing the procedure of a base image setting process.

The base image setting process (step S1130 in FIG. 7) will next be described. FIG. 8 is a flowchart showing the procedure of the base image setting process carried out by the CPU 22. Having initiated the base image setting process, the CPU 22 accesses the input source specified by the user and refers to image-containing data stored in the input source (step S1131). Specifically, when the user operates the input source detection button 80, the CPU 22 accesses the input IF 50 and the input IF 74 one by one to detect devices connected to each of the input IFs. Input sources in the present embodiment are the following devices shown in FIG. 2: the motion image data reproduction device MV; the flash memory MR; the digital camera CM; the scanner SCN; the computer PC; and the Internet connected to the projector via the server SV. The image storage unit 44, which stores a variety of images in advance, may also be an input source. Having detected input sources, the CPU 22 projects and displays the connected input sources (devices) in the form of user-selectable displayed images (dialog box, for example). The user selects a desired input source from the projected and displayed input sources with the infrared light pen P. The CPU 22 accesses the input source (device) specified by the user and refers to data stored in the specified input source.

Having referred to the specified input source, the CPU 22 checks whether the data in the specified input source is a still image or motion images (step S1132). When the data in the specified input source is a still image (step S1132: YES), the CPU 22 sets the still image in the specified input source to be the base image (step S1133) and terminates the base image setting process.

On the other hand, in step S1132, when the data in the specified input source are motion images (step S1132: NO), the motion images in the specified input source are reproduced, that is, projected and displayed (step S1134). The motion images may be reproduced and displayed in the edited image area EDF1 or as displayed images dedicated for motion image reproduction. In the present embodiment, the motion images are reproduced and displayed as displayed images dedicated for motion image reproduction.

When the user operates the capture button 82 (step S1135: YES) while the motion images are reproduced and displayed, the CPU 22 acquires a frame image in one of the motion images being reproduced and displayed, that is, a frame image in the motion image projected and displayed when the user operates the capture button 82, and stores the acquired frame image in the image storage unit 44 (step S1136). Having acquired the frame image, the CPU 22 sets the acquired frame image to be the base image (step S1137) and terminates the base image setting process. Having thus carried out the base image setting process, the CPU 22 carries out the processes in step S1124 and the following steps in the edited image generation process (FIG. 7).

Figure 9:
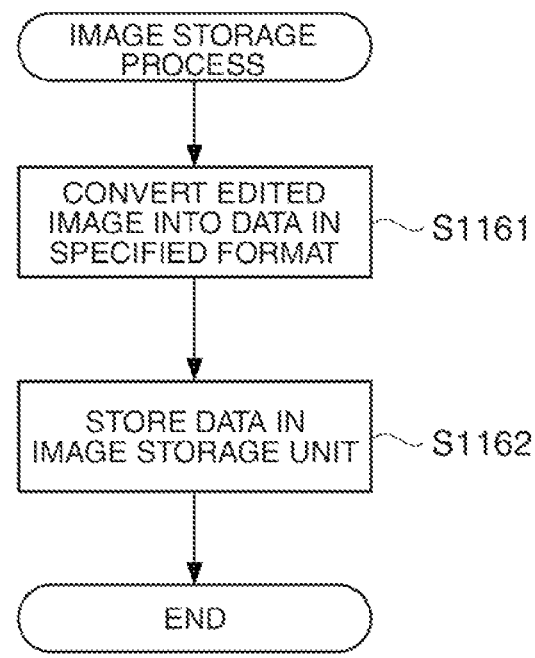
FIG. 9 is a flowchart showing the procedure of an image storage process.

The image storage process (step S1160 in FIG. 6) will next be described. FIG. 9 is a flowchart showing the procedure of the image storage process carried out by the CPU 22. Having initiated the image storage process, the CPU 22 converts the edited image into data expressed in a data format specified by the user (hereinafter also referred to as specified format) (step S1161). The user specifies the data format, after the user operates the save button 86 and the CPU 22 projects and displays several data formats in the form of user-selectable displayed images, by selecting a desired data format with the infrared light pen P. Examples of the user-selectable data formats include PNG, PDF, JPEG, and a unique format re-editable by the projector 20 (hereinafter also referred to as unique format). A variety of data formats other than those described above may be employed. The user selects a data format from those described above. Having converted the edited image into data expressed in the specified format, the CPU 22 saves the data in the image storage unit 44 (step S1162) and terminates the image storage process.

Figure 10:
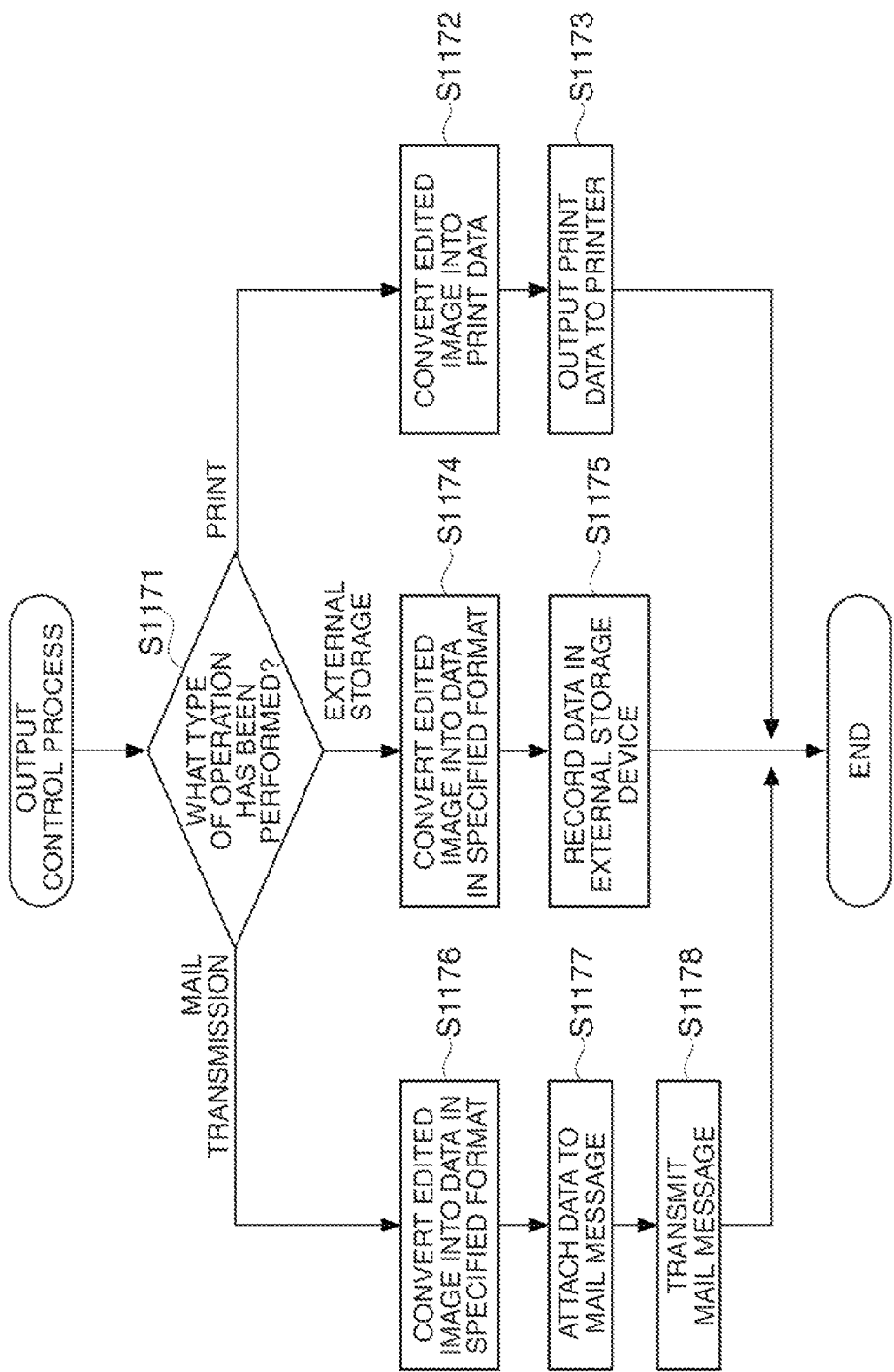
FIG. 10 is a flowchart showing the procedure of an output control process.

The output control process (step S1170 in FIG. 6) will next be described. FIG. 10 is a flowchart showing the procedure of the output control process carried out by the CPU 22 as the function of the output control unit 40. Having initiated the output control process, the CPU 22 carries out a process according to user's operation of the print button 84 or the print icon, or the external storage icon or the mail transmission icon displayed in the tool display area TLF1 (step S1171).

When the user operates the print button 84 or the print icon (step S1171: PRINT), the CPU 22 converts the edited image into print data (step S1172). Specifically, the CPU 22 has a printer driver capability as the function of the output control unit 40 and converts the edited image into print data that can be printed with the printer PR connected to the projector 20. The printer driver relevant to the printer PR connected to the projector 20 may be provided as the function of the output control unit 40 in advance, may be acquired from the printer PR when the printer PR is connected to the projector, or may be acquired from a source external to the projector 20, for example, from an external storage device or over a LAN.

Having converted the edited image into print data, the CPU 22 outputs the print data to the printer PR (step S1173). The printing device receives the print data from the projector 20 and carries out a print process. The above description has been made with reference to the case where an edited image being edited is printed, but the projector 20 can alternatively read a drawn image stored in the image storage unit 44 in the image storage process (FIG. 9) and print the drawn image. Specifically, when the user selects a drawn image from those displayed in the form of thumbnails in the drawn image area RSF1 with the infrared light pen P, the CPU 22 reads the selected drawn image from the image storage unit 44 and displays the image in the edited image area EDF1. Thereafter, when the user operates the print button 84, the CPU 22 carries out the processes in steps S1172 and S1173 described above to print the image.

Additionally, when converting the edited image into print data, the CPU 22 may perform the data conversion in such a way that the base image and the drawing image can be visually distinguished from each other in a printed image produced in the print process. The base image and the drawing image can be visually distinguished from each other, for example, by drawing the contour of a line drawing that forms the drawing image with a broken line or a white line, coloring the drawing image with a single specific color, increasing or decreasing the chroma or brightness of the base image as compared with that of the drawing image, or using a variety of other methods.

Further, when converting the edited image into print data, the CPU 22 may list drawing images in a printed image produced in the print process in chronological order of user's drawing actions. To this end, the CPU 22 stores each generated drawing image and the time when the drawing image is generated in the EEPROM 42 with the drawing image and the generated time related to each other, and when the edited image is converted into the print data, the CPU 22 generates print data that lists the drawing images based on the time when they are generated. The CPU 22 can carry out the print process based on the edited image in the variety of methods described above. Printed images are useful for the user who wants to review what was discussed in a conference along time series.

When the user operates the external storage icon (step S1171: EXTERNAL STORAGE), the CPU 22 converts the generated edited image into data expressed in a format specified by the user (step S1174). The user specifies the data format, after the user operates the external storage icon and the CPU 22 projects and displays data formats in the form of user-selectable displayed images, by selecting a desired data format with the infrared light pen P. Examples of the user-selectable data formats include PNG, PDF, JPEG, and a unique format. A variety of data formats other than those described above may be employed.

Having converted the edited image into data expressed in the specified format, the CPU 22 outputs the converted data to the flash memory MR connected to the output IF 52 or the output IF 75 (step S1175). The flash memory MR receives the data outputted from the projector 20 and records the data. After the user selects a specified format, the CPU 22 projects and displays a dialog box as a displayed image and the user can select an area in the flash memory MR where the data is saved. Alternatively, a default save area may be set in advance.

Further, the projector 20 can read a saved edited image stored in the image storage unit 44 in the image storage process (FIG. 9) and record the image in the flash memory MR. Specifically, the user reads a saved edited image displayed in the form of a thumbnail in the drawn image area RSF1 with the infrared light pen P and places the image in the edited image area EDF1, and the user then operates the external storage icon to instruct the CPU 22 to carry out the processes in steps S1174 and S1175 described above to record the image. Alternatively, a saved edited image displayed in the form of a thumbnail in the drawn image area RSF1 may not be read into the edited image area EDF1 but may be outputted directly to the flash memory MR. To this end, the user selects a thumbnail displayed image corresponding to a saved edited image that the user desires to store in the flash memory MR, and then the user operates the external storage icon to instruct the CPU 22 to output the selected saved edited image to the flash memory MR.

On the other hand, when the user operates the mail transmission icon (step S1171: MAIL TRANSMISSION), the CPU 22 converts the generated edited image into data expressed in a format specified by the user (step S1176), as in step S1174. The data on the edited image having undergone the data conversion is attached to a mail message (step S1177), and the mail message is transmitted via the server SV (step S1178).

Specifically, the CPU 22 has a mailer function as the function of the output control unit 40 and can attach the data on the edited image to a mail message and transmit the mail message. Mail addresses used as transmission destinations are displayed in the form of user-selectable displayed images after mail address data expressed in a specific data format (vCard®, for example) are externally acquired over a LAN or via the flash memory MR and the mailer is activated. The user selects a desired mail address with the infrared light pen P from one or more mail addresses displayed in the form of displayed images. An edited image attached to a mail message is not limited to the edited image being edited and may alternatively be an image specified by the user from saved edited images (drawn images) displayed in the form of thumbnails in the drawn image area RSF1. In this case, the CPU 22 reads the drawn image specified by the user in the drawn image area RSF1 from the image storage unit 44, converts the read image into data expressed in the specified format, and attaches the data to the mail message. The CPU 22 thus carries out the output control process.

As described above, the projector 20 according to the present embodiment is capable of recognizing a drawing action, generating and editing a drawing image, and storing an edited image. The user can therefore use the projector 20 as a whiteboard suitable in a conference without having to separately prepare a device having the functions described above (computer PC, for example) but with a relatively simple effort. Further, the projector 20 can store an edited image projected onto the screen SCR as it is in the image storage unit 44 and read back the stored drawn image. The user can therefore use the edited image recorded in the projector 20 as a minute in which what was discussed is recorded. Further, since the projector 20 can print and output the edited image, store the edited image in an external storage device, and transmit the edited image attached to a mail message, the user can save and distribute in a variety of methods the edited image as it is after having been drawn and edited. That is, the edited image recorded in the projector 20 can be shared by a plurality of users in a variety of forms.

The projector 20 can use an externally acquired still image or a frame image in externally acquired motion images as the base image. Further, the projector 20 can use an externally acquired still image or a frame image in externally acquired motion images as a material image. The projector 20 therefore allows a user's desired image to be projected and displayed, the user to create a drawing on the desired image, the user to draw and edit an edited image by using an externally acquired image as part of the edited image without separately preparing the computer PC having the functions described above.

The projector 20, which carries out the activation control process shown in FIG. 4, allows the user to use the WB mode immediately after simple operation. Further, the projector 20, which automatically stores an edited image in the image storage unit 44 when the user has not saved the edited image before the user powers off the projector, can hold the edited image even when the user forgets saving the edited image and powers off the projector. The projector 20, which can be operated through the operation panel 70, can be readily operated even when the projector 20 is a wall-mounted projector as shown in FIG. 1.

B. Second Embodiment

Action of Projector 20 in Second Embodiment

Figure 11:
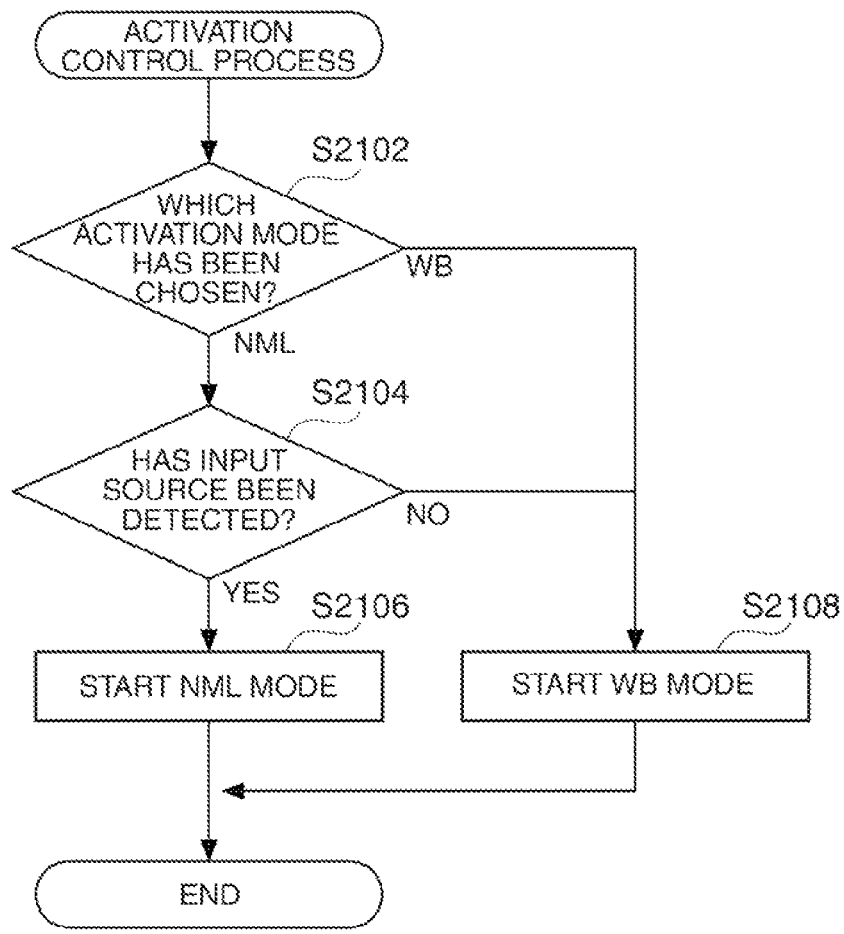
FIG. 11 is a flowchart showing the procedure of an activation control process in a second embodiment.

A second embodiment of the invention will next be described. The second embodiment differs from the first embodiment in terms of the action of the projector 20. The system configuration in the second embodiment is the same as that in the first embodiment, and no description thereof will therefore be made. The action of the projector 20 according to the second embodiment will be described below. FIG. 11 is a flowchart for describing the procedure of an activation control process carried out by the CPU 22 as the function of the activation control unit 41 when the user operates the NML mode activation button 76 or the WE mode activation button 78 to activate the projector 20. The activation control process is initiated when the user operates the NML mode activation button 76 or the WB mode activation button 78. After the activation control process is initiated, the CPU 22 determines whether the activation button that the user has operated is the NML mode activation button 76 or the WB mode activation button 78 (step S2102). When the activation button that the user has operated is the NML mode activation button 76 (step S2102: NML), the CPU 22 accesses devices connected to the input IF 50 or the input IF 74 one by one and searches for an input source (step S2104). When an input source is detected as a result of the search (step S2104: YES), the CPU 22 starts the NML mode (step S2106) and then terminates the activation control process.

When the projector 20 is activated in the NML mode, the CPU 22 generates an image to be displayed based on data inputted from the detected input source and projects and displays the image on the screen SCR. On the other hand, when the button that the user has operated is the WB mode activation button 78 in step S2102 (step S2102: WB), or when no input source is detected in step S2104 (step S2104: NO), the CPU 22 starts the WB mode (step S2108) and terminates the activation control process.

Figure 12:
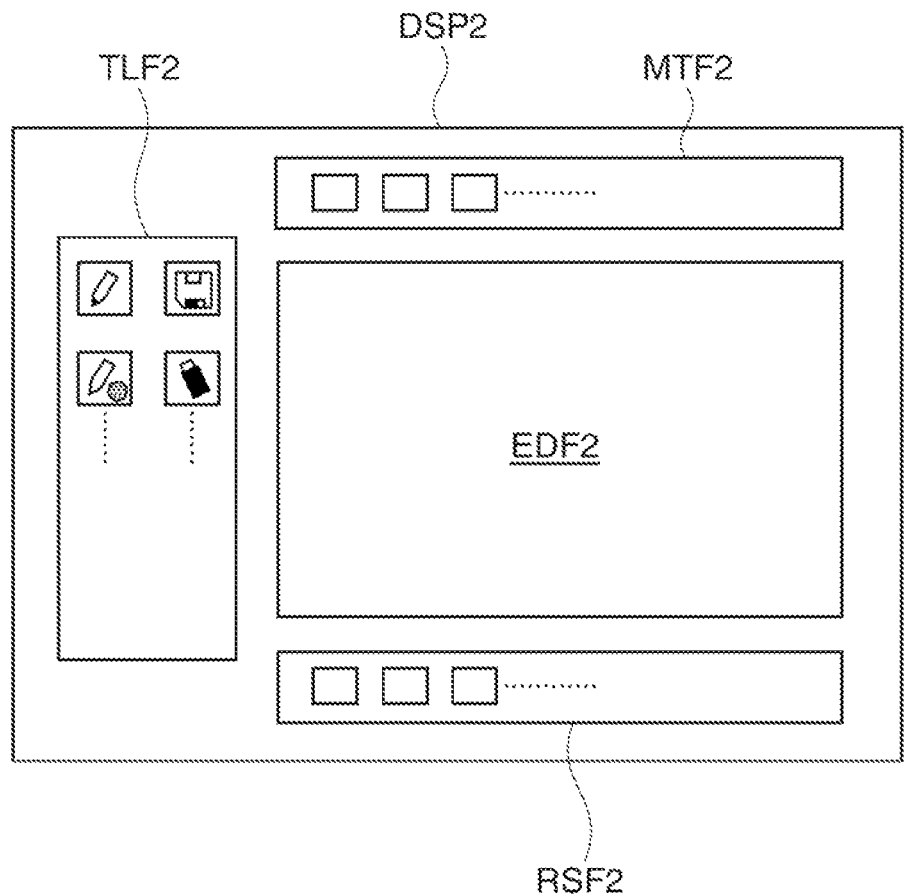
FIG. 12 is a descriptive diagram showing a WB displayed image in the second embodiment.

The action of the projector 20 in the WB mode will next be described. FIG. 12 is a descriptive diagram showing an image to be displayed that the projector 20 projects and displays on the screen SCR (hereinafter also referred to as WB displayed image DSP2) when the projector 20 is activated in the WB mode. General action of the projector 20 in the WB mode will be described with reference to FIG. 12, and then processes carried out in the WB mode will be described in detail with reference to a flowchart. The WB displayed image DSP2 is formed of an edited image area EDF2, a material image display area MTF2, a drawn image area RSF2, and a tool display area TLF2, as shown in FIG. 12.

The edited image area EDF2 is an area where a desired image that the user projects and displays on the screen SCR (hereinafter also referred to as base image), such as an image and a photograph for presentation, is displayed. The user can perform drawing and edit actions on the base image displayed in the edited image area EDF2 with the infrared light pen P. When the user performs drawing and editing, an image that reflects the drawing and editing (hereinafter also referred to as edited image) is displayed in the edited image area EDF2 in real time.

The material image display area MTF2 is an area where material images that are externally acquired and can be used as part of the edited image are displayed in the form of thumbnails. When the user who is performing drawing or editing selects one of the material images displayed in the form of thumbnails in the material image display area MTF2 with the infrared light pen P, the material image corresponding to the selected thumbnail is inserted in the edited image area EDF2. The user can use the inserted material image as part of the edited image.

The drawn image area RSF2 is an area where images having been drawn and edited by the user (hereinafter also referred to as drawn images) and saved in the image storage unit 44 are displayed in the form of thumbnails. When the user selects a thumbnail image from those displayed in the drawn image area RSF2 with the infrared light pen P, the drawn image corresponding to the selected thumbnail image is displayed in the edited image area EDF2 and the user is allowed to edit the edited image again.

The tool display area TLF2 is an area where icons corresponding to edit functions (hereinafter also referred to as tools) used by the user who is performing drawing and editing are displayed in the user-selectable forms. Examples of the displayed icons representing tools are as follows: an icon that allows the user to select the type of line drawing that forms a drawing image, such as "pen" and "brush"; an icon that allows the user to select the color of a line drawing; icons that represents figures that are stored in advance in the image storage unit 44 and can be inserted in an edited image, such as a circle, a triangle, and a rectangle; an icon that represents an eraser function for deleting a line drawing created in a drawing action; and icons that represent tools provided by typical application software having drawing and editing capabilities.

Further, the following icons representing tools are displayed in the tool display area TLF2: a base image setting icon representing a function of setting a base image to be displayed in the edited image area EDF2; a mail transmission icon representing a function of transmitting an edited image attached to a mail message; a save icon representing a function of storing an edited image displayed in the edited image area EDF2 in the image storage unit 44; an external storage icon representing a function of storing an edited image in an external storage device connected to the projector 20; and a print icon representing a function of printing an edited image. When the user who is performing drawing or editing selects any of the variety of icons displayed in the tool display area TLF2 with the infrared light pen P, the tool function corresponding to the selected icon is activated.

Figure 13:
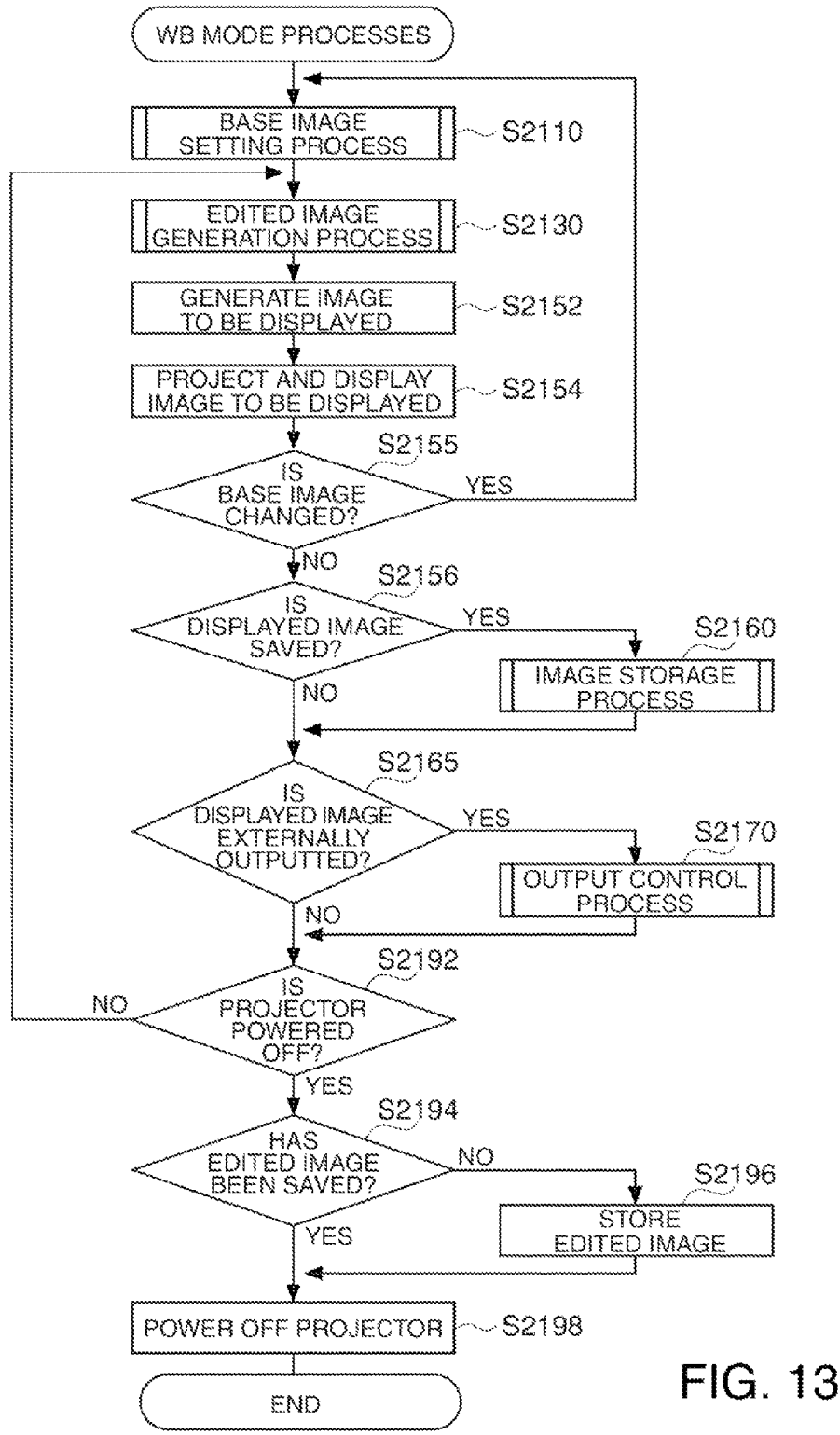
FIG. 13 is a flowchart showing the procedure of WE mode processes in the second embodiment.

Processes carried out by the CPU 22 in the WB mode (hereinafter referred to as WB mode processes) will next be described with reference to a flowchart. FIG. 13 is a flowchart showing the procedure of the WE mode processes carried out by the CPU 22. The WB mode processes are initiated when the WB mode starts (step S2108 in FIG. 11) in the activation control process (FIG. 11). Having initiated the WB mode, the CPU 22 carries out a base image setting process (step S2110). The base image setting process is a process of acquiring an image from the input source specified by the user among the input source devices connected to the projector via the input IF 50 or the input IF 74 and setting the acquired image to be the base image. In the base image setting process, the WB displayed image DSP2, in which the base image set by the user is displayed in the edited image area EDF2, is projected and displayed as a displayed image on the screen SCR. The base image setting process will be described later in detail.

After the base image setting process, the CPU 22 carries out an edited image generation process (step S2130) as the function of the edited image generation unit 28. The edited image generation process is a process in which the CPU 22 generates an edited image based on drawing and editing actions performed by the user by using the infrared light pen P on the edited image area EDF2 in the WB displayed image DSP2 having been projected and displayed. The edited image generation process will be described later in detail.

After the edited image generation process, the CPU 22 generates an image to be displayed based on the generated edited image (step S2152). Specifically, the CPU 22 generates a WB displayed image DSP2 in which the generated edited image is displayed in the edited image area EDF2. The CPU 22 then uses the generated WB displayed image DSP2 as an image to be displayed. Having generated the image to be displayed, the CPU 22 projects and displays the generated image to be displayed on the screen SCR (step S2154).

Thereafter, when the user operates the base image setting icon to set the base image again (step S2155: YES), the CPU 22 repeats the processes described above from step S2110. When the user does not operate the base image setting icon (step S2155: NO), the CPU 22 proceeds to the process in step 2156.

Thereafter, when the user operates the save button 86 (see FIG. 3) or the save icon as a tool (step S2156: YES), the CPU 22 carries out an image storage process (step S2160) as the function of the image storage processing unit 39. The image storage process will be described later.

Further, when the user operates the print button 84, or the mail transmission icon or the external storage icon as tools (step S2165: YES), the CPU 22 carries out an output control process of outputting data out of the projector 20 as the function of the output control unit 40 (step S2170). The output control process will be described later.

The CPU 22 repeatedly carries out the processes in steps S2130 to S2170 until the user operates the NML mode activation button 76 to power off the projector (step S2192: NO). When the user operates the NML mode activation button 76 to power off the projector (step S2192: YES), the CPU 22 checks whether or not the edited image being edited and displayed in the edited image area EDF2 has been saved in step S2156 (step S2194). When the edited image being edited has not been saved (step S2194: NO), the CPU 22 stores the edited image in a re-editable format in the image storage unit 44 (step S2196). The CPU 22 then powers off the projector 20 (step S2198) and terminates the WB mode processes.

Figure 14:
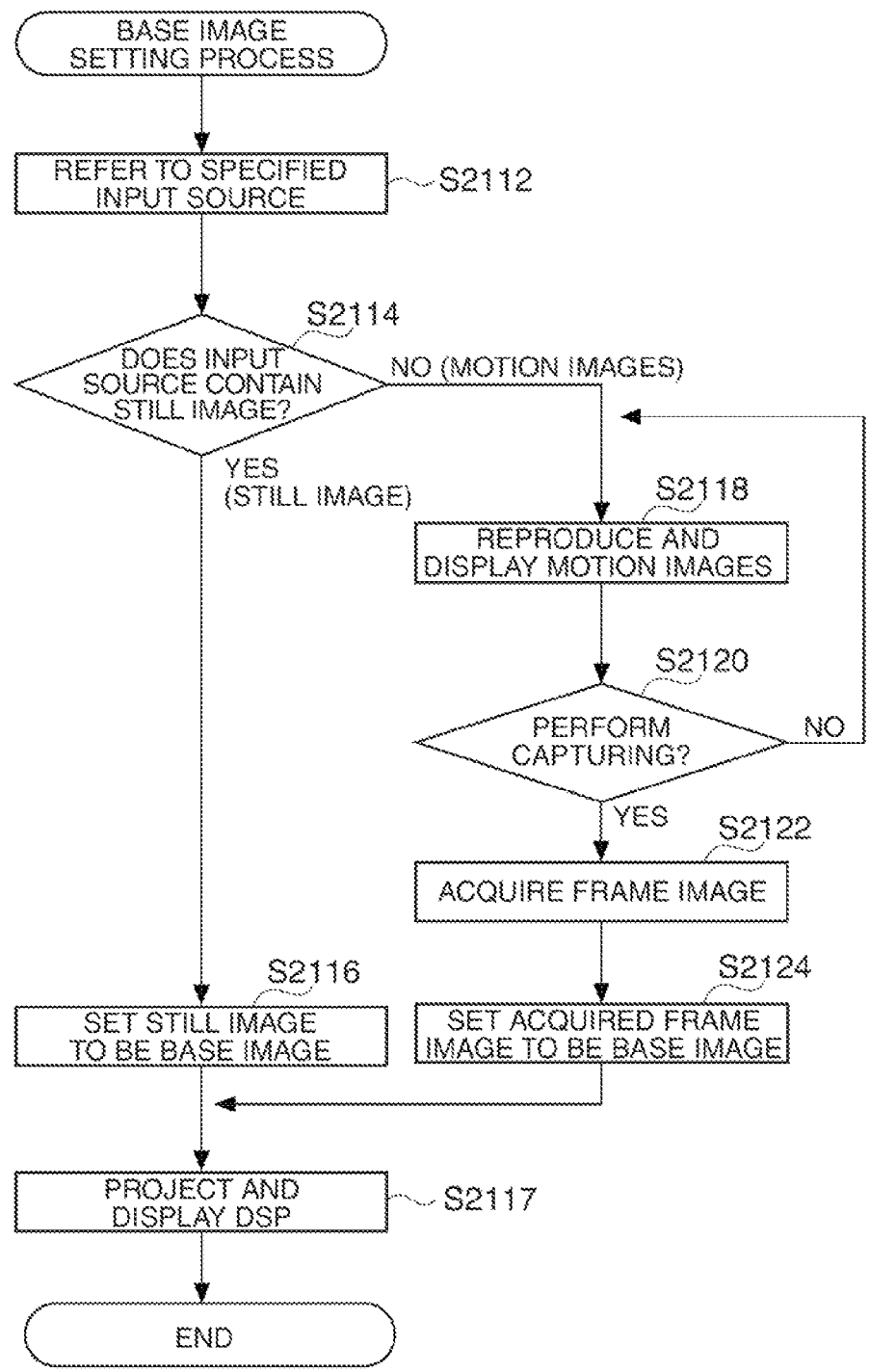
FIG. 14 is a flowchart showing the procedure of a base image setting process in the second embodiment.

The base image setting process (step S2110 in FIG. 13) will next be described. FIG. 14 is a flowchart showing the procedure of the base image setting process carried out by the CPU 22. Having initiated the base image setting process, the CPU 22 accesses the input source specified by the user and refers to image-containing data stored in the input source (step S2112). Specifically, when the user operates the input source detection button 80, the CPU 22 accesses the input IF 50 and the input IF 74 one by one to detect devices connected to each of the input IFs. Input sources in the present embodiment are the following devices shown in FIG. 2: the motion image data reproduction device MV; the flash memory MR; the digital camera CM; the scanner SCN; the computer PC; and websites on the Internet connected to the projector via the server SV. The image storage unit 44, which stores a variety of images in advance, may also be an input source. Having detected input sources, the CPU 22 projects and displays the connected input sources (devices) in the form of user-selectable displayed images (dialog box, for example). The user selects a desired input source from the projected and displayed input sources with the infrared light pen P. The CPU 22 accesses the input source (device) specified by the user and refers to data stored in the specified input source.

Having referred to the specified input source, the CPU 22 checks whether the data in the specified input source is a still image or motion images (step S2114). When the data in the specified input source is a still image (step S2114: YES), the CPU 22 sets the still image in the specified input source to be the base image as the function of the still image acquisition unit 34 (step S2116). The CPU 22 then projects and displays a WB displayed image DSP2 in which the thus set base image is displayed as a displayed image in the edited image area EDF2 (step S2117). The CPU 22 then terminates the base image setting process.

On the other hand, in step S2114, when the data in the specified input source are motion images (step S2114: NO), the motion images in the specified input source are reproduced, that is, projected and displayed (step S2118). The motion images may be reproduced and displayed in the edited image area EDF2 or as displayed images dedicated for motion image reproduction. In the present embodiment, the motion images are reproduced and displayed as displayed images dedicated for motion image reproduction.

When the user operates the capture button 82 while the motion images are reproduced and displayed (step S2120: YES), the CPU 22 acquires a frame image in one of the motion images being reproduced and displayed, that is, a frame image in the motion image projected and displayed when the user operates the capture button 82, and stores the acquired frame image in the image storage unit 44 (step S2122) as the function of the frame image acquisition unit 36. When the user does not operate the capture button 82 while the motion images are reproduced (step S2120: NO), the CPU 22 repeatedly reproduces the motion images. Alternatively, a first image of the motion images may be acquired as the frame image. Having acquired the frame image, the CPU 22 sets the acquired frame image to be the base image (step S2124). The CPU 22 then projects and displays a WB displayed image DSP2 in which the thus set base image is displayed in the edited image area EDF2 as a displayed image (step S2117) and terminates the base image setting process.

Figure 15:
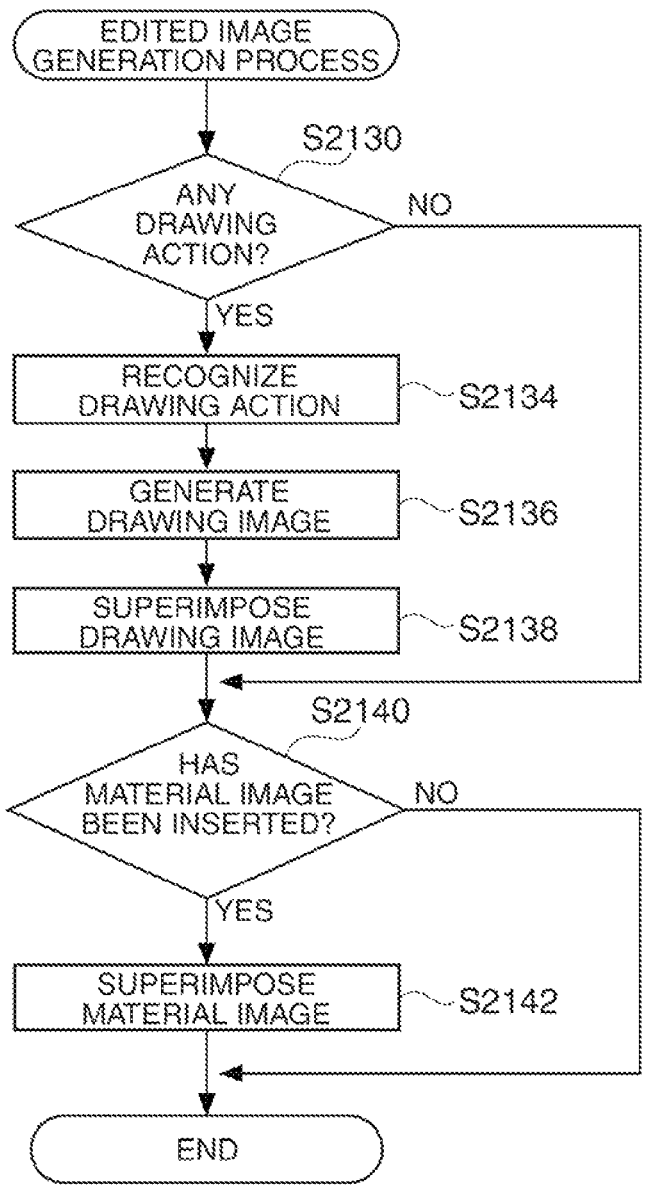
FIG. 15 is a flowchart showing the procedure of an edited image generation process in the second embodiment.

The edited image generation process (step S2130 in FIG. 13) carried out by the CPU 22 will next be described. FIG. 15 is a flowchart showing the procedure of the edited image generation process carried out by the CPU 22. Having started the edited image generation process, the camera 54 detects the infrared light emitted from the infrared light pen P, and the CPU 22 determines whether or not the user is performing a drawing action on the edited image area EDF2 on the screen SCR based on a result of the detection (step S2132). When the CPU 22 determines that the user is performing a drawing action (step S2132: YES), the CPU 22 recognizes the drawing action being performed by the user (step S2134). Specifically, the CPU 22 controls the camera 54 to capture images of the screen SCR and a portion in the vicinity thereof at predetermined intervals. Based on the captured image, the CPU 22 recognizes the path of the infrared light emitted from the infrared light pen P and converts the recognized path into coordinate data.

Having recognized the drawing action, the CPU 22 generates a drawing image based on the recognized drawing action as the function of the drawing image generation unit 26 (step S2136). Specifically, a line drawing is created based on the coordinate data produced from the path of the infrared light emitted from the infrared light pen P. In this process, when the user has selected a predetermined tool function in advance, a line drawing according to the tool function is created. For example, when the brush has been selected as the type of line drawing and red has been selected as the color of the line drawing, the CPU 22 generates a drawing image formed of a red line drawing drawn with the brush as the function of the tool control unit 30. Having generated the drawing image, the CPU 22 superimposes the drawing image on the base image having been set (step S2138).

The CPU 22 then checks whether or not the user has inserted a material image in the edited image (step S2140). Specifically, the CPU 22 checks if the user has selected a material from those displayed in the form of thumbnails in the material image display area MTF2 with the infrared light pen P. When the user has selected a material image (step S2140: YES), the CPU 22 reads the material image selected by the user from the material images stored in the image storage unit 44 in advance and superimposes the material image on the image generated in the processes through step 2140 (image generated by superimposing drawing image on base image when "YES" in step S2132, whereas base image when "NO" in step S2132) to generate an edited image (step S142). The CPU 22 then terminates the edited image generation process.

On the other hand, when the user has selected no material image (step S2140: NO), the CPU 22 sets the image generated in the processes through step S2140 to be an edited image and terminates the edited image generation process. It is noted that the material images stored in the image storage unit 44 are images acquired by the CPU 22 in advance from an input source connected to the projector via the input IF 50 or the input IF 74 in order to use the images as material images and stored by the CPU 22 in the image storage unit 44. The CPU 22 stores the material images in response to a user's instruction. The CPU 22 thus carries out the edited image generation process.

Figure 16:
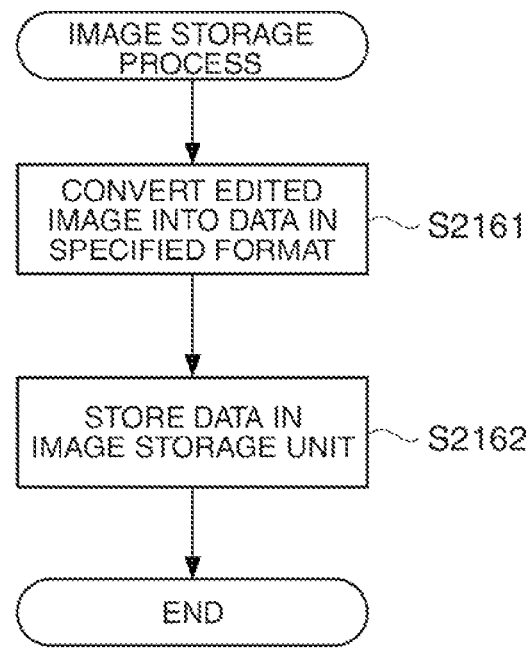
FIG. 16 is a flowchart showing the procedure of an image storage process in the second embodiment.

The image storage process (step S2160 in FIG. 13) will next be described. FIG. 16 is a flowchart showing the procedure of the image storage process carried out by the CPU 22. Having initiated the image storage process, the CPU 22 converts the edited image into data expressed in a data format specified by the user (hereinafter also referred to as specified format) (step S2161). The user specifies the data format, after the user operates the save button 86 and the CPU 22 projects and displays several data formats in the form of user-selectable displayed images, by selecting a desired data format with the infrared light pen P. Examples of the user-selectable data formats include PNG, PDF, JPEG, and a unique format re-editable by the projector 20 (hereinafter also referred to as unique format). A variety of data formats other than those described above may be employed. The user selects a data format from those described above. Having converted the edited image into data in the specified format, the CPU 22 saves the data in the image storage unit 44 (step S2162) and terminates the image storage process.

Figure 17:
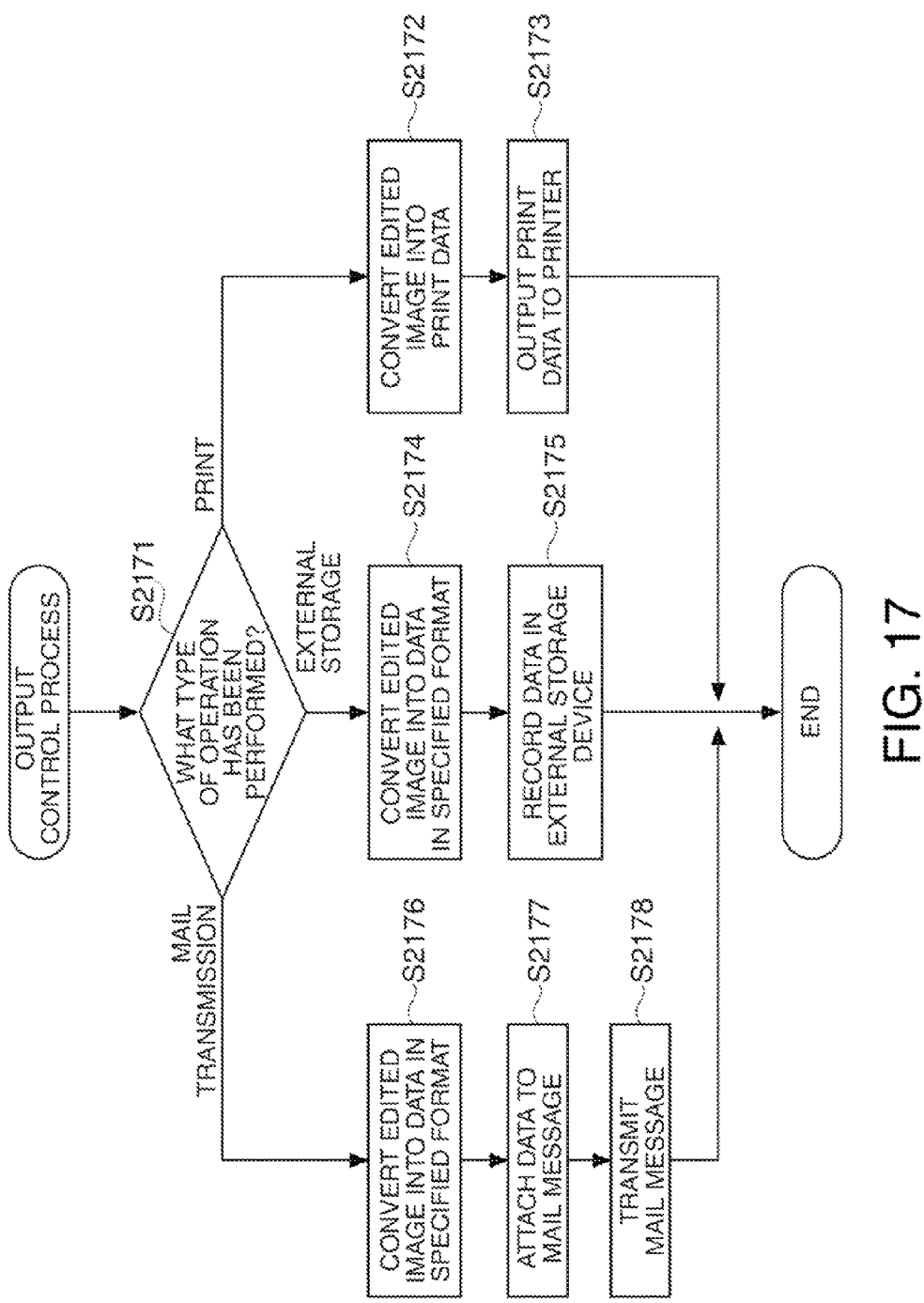
FIG. 17 is a flowchart showing the procedure of an output control process in the second embodiment.

The output control process (step S2170 in FIG. 13) will next be described. FIG. 17 is a flowchart showing the procedure of the output control process carried out by the CPU 22 as the function of the output control unit 40. Having initiated the output control process, the CPU 22 carries out a process according to user's operation of the print button 84 or the print icon, or the external storage icon or the mail transmission icon displayed in the tool display area TLF2 (step S2171).

When the user operates the print button 84 or the print icon (step S2171: PRINT), the CPU 22 converts the edited image into print data (step S2172). Specifically, the CPU 22 has a printer driver capability as the function of the output control unit 40 and converts the edited image into print data that can be printed with the printer PR connected to the projector 20. The printer driver relevant to the printer PR connected to the projector 20 may be provided as the function of the output control unit 40 in advance, may be acquired from the printer PR when the printer PR is connected to the projector, or may be acquired from a source external to the projector 2, for example, from an external storage device or over a LAN.

Having converted the edited image into print data, the CPU 22 outputs the print data to the printer PR (step S2173). The printing device receives the print data from the projector 20 and carries out a print process. The above description has been made with reference to the case where an edited image being edited is printed, but the projector 20 can alternatively read a drawn image stored in the image storage unit 44 in the image storage process (FIG. 16) and print the drawn image. Specifically, when the user selects a drawn image from those displayed in the form of thumbnails in the drawn image area RSF2 with the infrared light pen P, the CPU 22 reads the selected drawn image from the image storage unit 44 and displays the image in the edited image area EDF2. Thereafter, when the user operates the print button 84, the CPU 22 carries out the processes in steps S2172 and S2173 described above to print the image.

Additionally, when converting the edited image into print data, the CPU 22 may perform the data conversion in such a way that the base image and the drawing image can be visually distinguished from each other in a printed image produced in the print process. The base image and the drawing image can be visually distinguished from each other, for example, by drawing the contour of a line drawing that forms the drawing image with a broken line or a white line, coloring the drawing image with a single specific color, increasing or decreasing the chroma or brightness of the base image as compared with that of the drawing image, or using a variety of other methods.

Further, when converting the edited image into print data, the CPU 22 may list drawing images in a printed image produced in the print process in chronological order of user's drawing actions. To this end, the CPU 22 stores each generated drawing image and the time when the drawing image is generated in the EEPROM 42 with the drawing image and the generated time related to each other, and when the edited image is converted into the print data, the CPU 22 generates print data that lists the drawing images based on the time when they are generated. The CPU 22 can carry out the print process based on the edited image in the variety of methods described above. Printed images are useful for the user who wants to review what was discussed in a conference along time series.

When the user operates the external storage icon (step S2171: EXTERNAL STORAGE), the CPU 22 converts the generated edited image into data expressed in a format specified by the user (step S2174). The user specifies the data format, after the user operates the external storage icon and the CPU 22 projects and displays data formats in the form of user-selectable displayed images, by selecting a desired data format with the infrared light pen P. Examples of the user-selectable data formats include PNG, PDF, JPEG, and a unique format. A variety of data formats other than those described above may be employed.

Having converted the edited image into data expressed in the specified format, the CPU 22 outputs the converted data to the flash memory MR connected to the output IF 52 or the output IF 75 (step S2175). The flash memory MR receives the data outputted from the projector 20 and records the data. After the user selects a specified format, the CPU 22 projects and displays a dialog box as a displayed image and the user can select an area in the flash memory MR where the data is saved. Alternatively, a default save area may be set in advance.

Further, the projector 20 can read a saved edited image stored in the image storage unit 44 in the image storage process (FIG. 16) and record the image in the flash memory MR. Specifically, the user reads a saved edited image displayed in the form of a thumbnail in the drawn image area RSF2 with the infrared light pen P and places the image in the edited image area EDF2, and the user then operates the external storage icon to instruct the CPU 22 to carry out the processes in steps S2174 and S2175 described above to record the image. Alternatively, a saved edited image displayed in the form of a thumbnail in the drawn image area RSF2 may not be read into the edited image area EDF2 but may be outputted directly to the flash memory MR. To this end, the user selects a thumbnail displayed image corresponding to a saved edited image that the user desires to store in the flash memory MR, and then the user operates the external storage icon to instruct the CPU 22 to output the selected saved edited image to the flash memory MR.

On the other hand, when the user operates the mail transmission icon (step S2171: MAIL TRANSMISSION), the CPU 22 converts the generated edited image into data expressed in a format specified by the user (step S2176), as in step S2174. The data on the edited image having undergone the data conversion is attached to a mail message (step S2177), and the mail message is transmitted via the server SV (step S2178).

Specifically, the CPU 22 has a mailer function as the function of the output control unit 40 and can attach the data on the edited image to a mail message and transmit the mail message. Mail addresses used as transmission destinations are displayed in the form of user-selectable displayed images after mail address data expressed in a specific data format (vCard®, for example) are externally acquired over a LAN or via the flash memory MR and the mailer is activated. The user selects a desired mail address with the infrared light pen P from one or more mail addresses displayed in the form of displayed images. An edited image attached to a mail message is not limited to the edited image being edited and may alternatively be an image specified by the user from saved edited images (drawn images) displayed in the form of thumbnails in the drawn image area RSF2. In this case, the CPU 22 reads the drawn image specified by the user in the drawn image area RSF2 from the image storage unit 44, converts the read image into data expressed in the specified format, and attaches the data to the mail message. The CPU 22 thus carries out the output control process.

As described above, when the user performs drawing and editing actions on a projected, displayed base image, the projector 20 according to the present embodiment can recognize the drawing and the editing actions, produce and edit a drawing image, generate an edited image by using the base image as a background image, and project and display the edited image in real time. Further, the projector 20 can store the edited image. The user can therefore use the projector 20 as a whiteboard suitable in a conference without having to separately prepare a device having the functions described above (computer PC, for example) but with a relatively simple effort.

Further, the projector 20 can store an edited image projected onto the screen SCR as it is in the image storage unit 44 and read back the stored drawn image. The user can therefore use the edited image recorded in the projector 20 as a minute in which what was discussed is recorded. Further, since the projector 20 can print and output the edited image, store the edited image in an external storage device, and transmit the edited image attached to a mail message, the user can store and distribute in a variety of methods the edited image as it is after having been drawn and edited. That is, the edited image recorded in the projector 20 can be shared by a plurality of users in a variety of forms.

The projector 20 can use an externally acquired still image or a frame image in externally acquired motion images as the base image. Further, the projector 20 can use an externally acquired still image or a frame image in externally acquired motion images as a material image. The projector 20 therefore allows a users desired image to be projected and displayed, the user to create a drawing on the desired image, the user to draw and edit an edited image by using an externally acquired image as part of the edited image without separately preparing the computer PC having the functions described above.

The projector 20, which carries out the activation control process shown in FIG. 11, allows the user to use the WB mode immediately after simple operation. Further, the projector 20, which automatically stores an edited image in the image storage unit 44 when the user has not saved the edited image before the user powers off the projector, can hold the edited image even when the user forgets saving the edited image and powers off the projector. The projector 20, which can be operated through the operation panel 70, can be readily operated even when the projector 20 is a wall-mounted projector as shown in FIG. 1.

C. Third Embodiment

Action of Projector 20 in Third Embodiment

Figure 18:
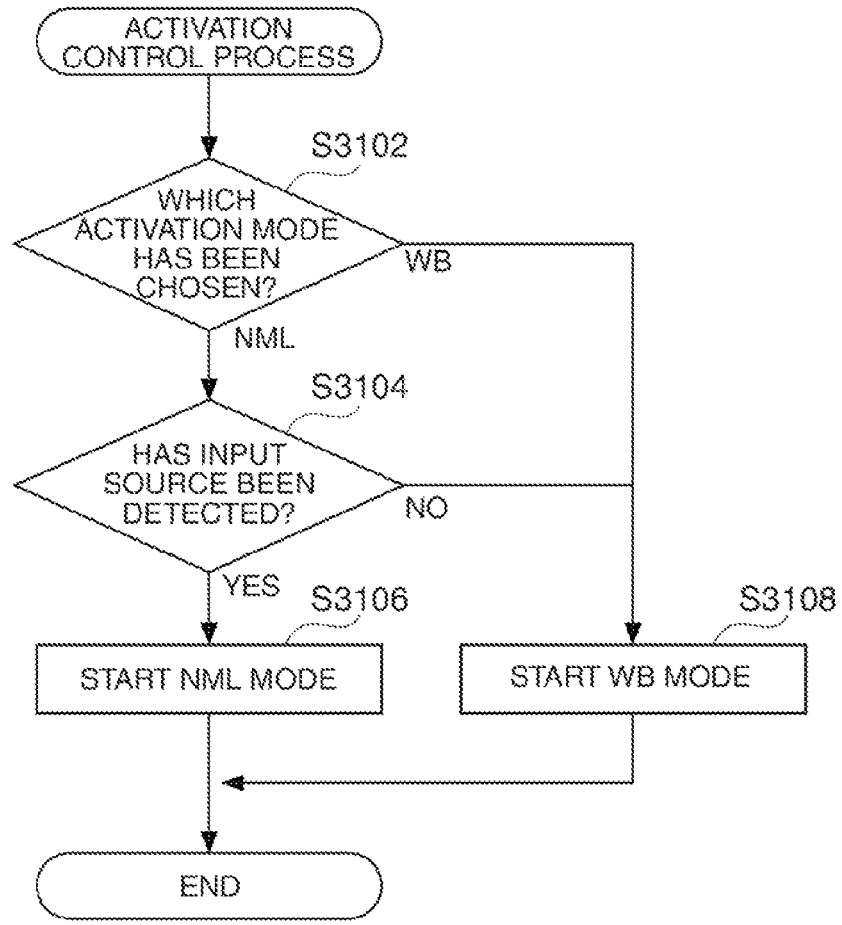
FIG. 18 is a flowchart showing the procedure of an activation control process in a third embodiment.

A third embodiment of the invention will next be described. The third embodiment differs from the first embodiment in terms of the action of the projector 20. The system configuration in the third embodiment is the same as that in the first embodiment, and no description thereof will therefore be made. The action of the projector 20 according to the third embodiment will next be described. FIG. 18 is a flowchart for describing the procedure of an activation control process carried out by the CPU 22 as the function of the activation control unit 41 when the user operates the NML mode activation button 76 or the WB mode activation button 78 to activate the projector 20. The activation control process is initiated when the user operates the NML mode activation button 76 or the WB mode activation button 78. After the activation control process is initiated, the CPU 22 determines whether the activation button that the user has operated is the NML mode activation button 76 or the WB mode activation button 78 (step S3102). When the activation button that the user has operated is the NML mode activation button 76 (step S3102: NML), the CPU 22 accesses devices connected to the input IF 50 or the input IF 74 one by one and search for an input source (step S3104). When an input source is detected as a result of the search (step S3104: YES), the CPU 22 starts the NML mode (step S3106) and then terminates the activation control process.

When the projector 20 is activated in the NML mode, the CPU 22 generates an image to be displayed based on data inputted from the detected input source and projects and displays the image on the screen SCR. On the other hand, when the button that the user has operated in step S3102 is the WB mode activation button 78 (step S3102: WB), or when no input source is detected in step S3104 (step S3104: NO), the CPU 22 starts the WB mode (step S3108) and terminates the activation control process.

Figure 19:
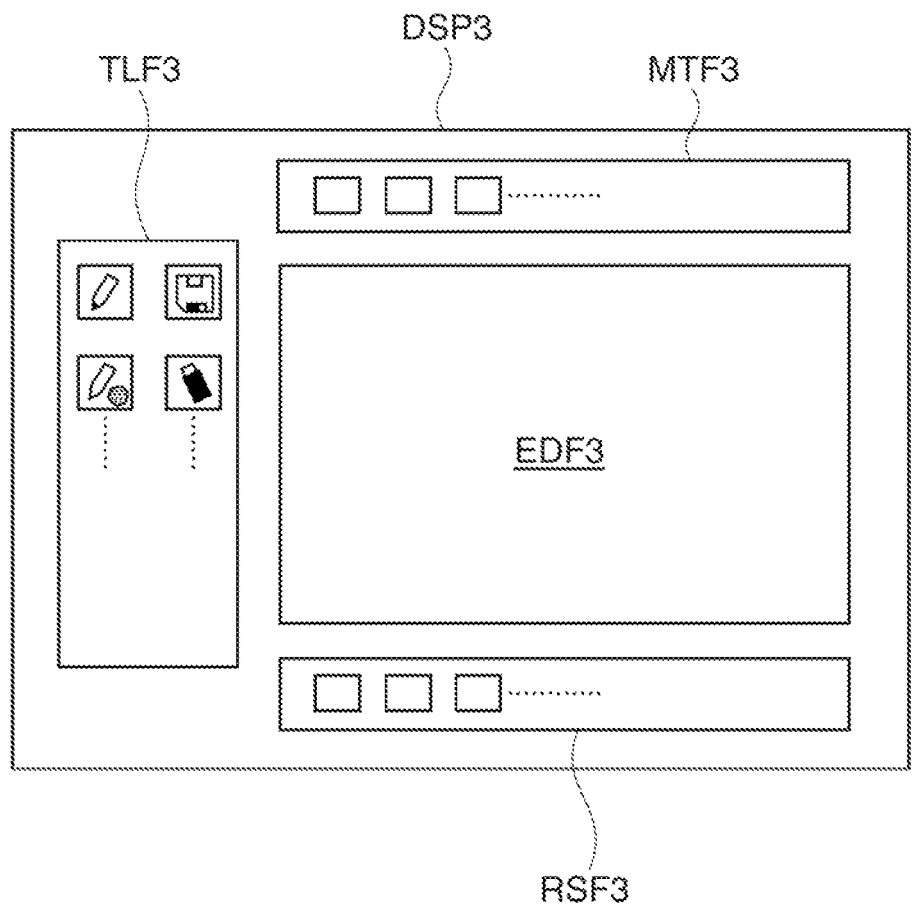
FIG. 19 is a descriptive diagram showing a WB displayed image in the third embodiment.

The action of the projector 20 in the WB mode will next be described. FIG. 19 is a descriptive diagram showing an image to be displayed that the projector 20 projects and displays on the screen SCR (hereinafter also referred to as WB displayed image DSP3) when the projector 20 is activated in the WB mode. General action of the projector 20 in the WE mode will be described with reference to FIG. 19, and then processes carried out in the WB mode will be described in detail with reference to a flowchart. The WB displayed image DSP3 is formed of an edited image area EDF3, a candidate image area SLF3, a drawn image area RSF3, and a tool display area TLF3, as shown in FIG. 19.

The edited image area EDF3 is an area where a desired image that the user projects and displays on the screen SCR, such as an image and a photograph for presentation, is displayed. An image displayed in the edited image area EDF3 is hereinafter also referred to as a base image. The user can perform drawing and editing actions on the base image displayed in the edited image area EDF3 with the infrared light pen P. Drawing and editing actions are hereinafter referred to as editing in a broad sense. After the user performs editing, an image that reflects the editing (hereinafter also referred to as edited image) is displayed in the edited image area EDF3 in real time.

The candidate image area SLF3 is an area where images externally acquired via the input IF 50 or the input IF 74 and stored in the image storage unit 44 (hereinafter also referred to as candidate images) are displayed in the form of thumbnails. When the user who is performing drawing or editing selects one of the candidate images displayed in the form of thumbnails in the candidate image area SLF3 with the infrared light pen P, the candidate image corresponding to the selected thumbnail is displayed as the base image in the edited image area EDF3.

The drawn image area RSF3 is an area where images having been drawn and edited by the user (hereinafter also referred to as drawn images) and saved in the image storage unit 44 are displayed in the form of thumbnails. When the user selects a drawn image from those displayed in the form of thumbnails in the drawn image area RSF3 with the infrared light pen P, the drawn image corresponding to the selected thumbnail is displayed in the edited image area EDF3 and the user is allowed to edit the edited image again.

The tool display area TLF3 is an area where icons corresponding to edit functions (hereinafter also referred to as tools) used by the user who is performing drawing and editing are displayed in the user-selectable forms. Examples of the displayed icons representing tools are as follows: an icon that allows the user to select the type of line drawing that forms a drawing image, such as "pen" and "brush"; an icon that allows the user to select the color of a line drawing; icons that represent figures stored in the image storage unit 44 in advance and can be inserted in an edited image, such as a circle, a triangle, and a rectangle; an icon that represents an eraser function for deleting a line drawing created in a drawing action; and icons that represent tools provided by typical application software having drawing and editing capabilities.

Further, the following icons representing tools are displayed in the tool display area TLF3: an image input icon representing a function of externally inputting an image; a mail transmission icon representing a function of transmitting an edited image attached to a mail message; a save icon representing a function of storing an edited image displayed in the edited image area EDF3 in the image storage unit 44; an external storage icon representing a function of storing an edited image in an external storage device connected to the projector 20; and a print icon representing a function of printing an edited image. When the user who is performing drawing or editing selects any of the variety of icons displayed in the tool display area TLF3 with the infrared light pen P, the tool function corresponding to the selected icon is activated.

Figure 20:
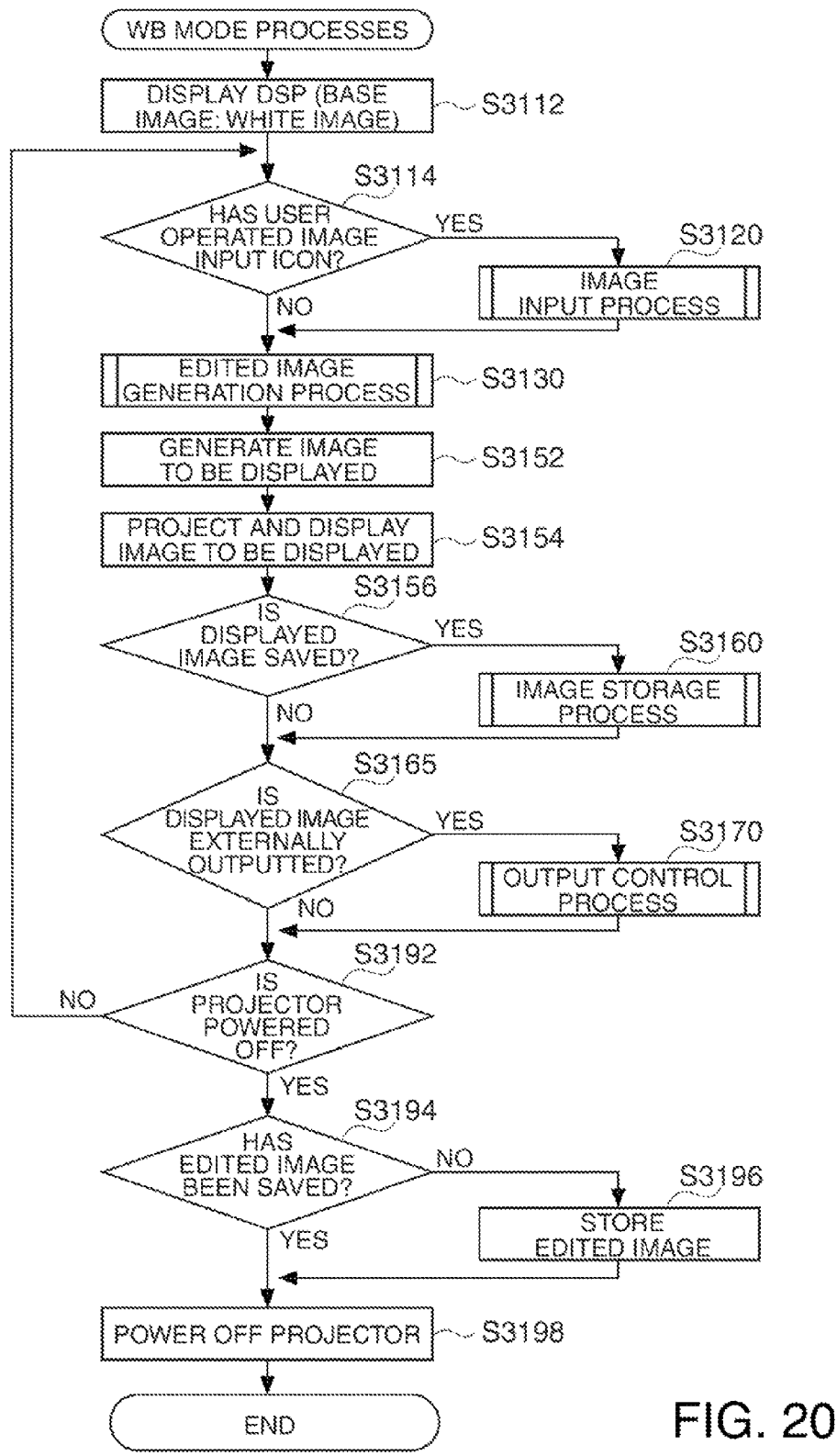
FIG. 20 is a flowchart showing the procedure of WB mode processes in the third embodiment.

Processes carried out by the CPU 22 in the WB mode (hereinafter referred to as WB mode processes) will next be described with reference to a flowchart. FIG. 20 is a flowchart showing the procedure of the WE mode processes carried out by the CPU 22. The WB mode processes are initiated when the WB mode is activated (step S3108 in FIG. 18) in the activation control process (FIG. 18). Having initiated the WE mode, the CPU 22 projects and displays a WB displayed image DSP3 in which a white-colored image (white image) is set as the base image in the edited image area EDF3 (step S3112). The CPU 22 then checks if the user has operated the image input icon (step S3114). When the user has operated the image input icon (step S3114: YES), the CPU 22 carries out an image input process (step S3120). The image input process is a process of acquiring an image from a data output device connected to the projector 20 via the input IF 50 or the input IF 74 and storing the acquired image in the image storage unit 44. The image stored in the image storage unit 44 in the image input process can be used as the base image displayed in the edited image area EDF3. The image input process will be described later in detail.

On the other hand, when the user has not operated the image input icon (step S3114: NO), or after the image input process (step S3120) is completed, the CPU 22 carries out an edited image generation process (step S3130) as the function of the edited image generation unit 28. The edited image generation process is a process in which the CPU 22 generates an edited image based on drawing and editing actions performed by the user by using the infrared light pen P on the edited image area EDF3 in the WB displayed image DSP3 having been projected and displayed. The edited image generation process will be described later in detail.

After the edited image generation process, the CPU 22 generates an image to be displayed based on the generated edited image (step S3152). Specifically, the CPU 22 generates a WB displayed image DSP3 in which the generated edited image is displayed in the edited image area EDF3. The CPU 22 then uses the generated WB displayed image DSP3 as an image to be displayed. Having generated the image to be displayed, the CPU 22 projects and displays the generated image to be displayed on the screen SCR (step S3154).

Thereafter, when the user operates the save button 86 (see FIG. 3) or the save icon as a tool (step S3156: YES), the CPU 22 carries out an image storage process (step S3160) as the function of the image storage processing unit 39. The image storage process will be described later.

Further, when the user operates the print button 84, or the mail transmission icon or the external storage icon as tools (step S3165: YES), the CPU 22 carries out an output control process of outputting data out of the projector 20 as the function of the output control unit 40 (step S3170). The output control process will be described later.

The CPU 22 repeatedly carries out the processes in steps S3114 to S3170 until the user operates the NML mode activation button 76 to power off the projector (step S3192: NO). When the user operates the NML mode activation button 76 to power off the projector (step S3192: YES), the CPU 22 checks whether or not the edited image being edited and displayed in the edited image area EDF3 has been saved in step S3156 (step S3194). When the edited image being edited has not been saved (step S3194: NO), the CPU 22 stores the edited image in a re-editable format in the image storage unit 44 (step S3196). The CPU 22 then powers off the projector 20 (step S3198) and terminates the WB mode processes.

Figure 21:
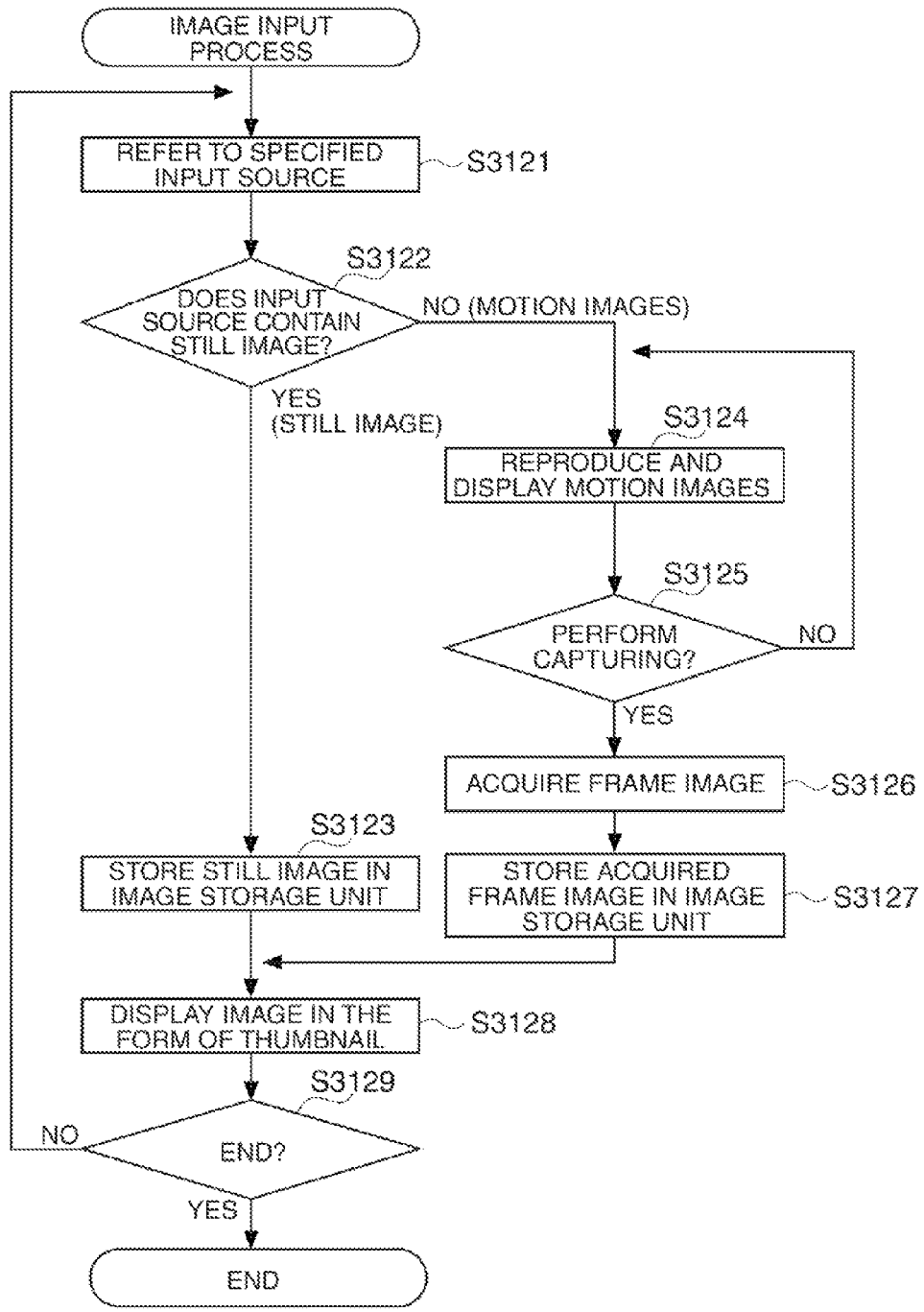
FIG. 21 is a flowchart showing the procedure of an image input process in the third embodiment.

The image input process (step S3120 in FIG. 20) will next be described. FIG. 21 is a flowchart showing the procedure of the image input process carried out by the CPU 22. The image input process is a process of acquiring a desired image to be set as the base image by the user from a data output device (input source) connected to the projector via the input IF 50 or the input IF 74.

The image input process is initiated when the user operates the image input icon (step S3114 in FIG. 20: YES). Having initiated the image input process, the CPU 22 accesses an input source specified by the user and refers to image-containing data stored in the input source (step S3121 in FIG. 21). Specifically, when the user operates the image input icon, the CPU 22 accesses the input IF 50 and the input IF 74 one by one to detect devices connected to each of the input IFs. Input sources in the present embodiment are the following devices shown in FIG. 2: the motion image data reproduction device MV; the flash memory MR; the digital camera CM; the scanner SCN; the computer PC; and websites on the Internet connected to the projector via the server SV. Having detected input sources, the CPU 22 projects and displays the connected input sources (devices) in the form of user-selectable displayed images (dialog box, for example). The user selects a desired input source and image data from the projected and displayed input sources with the infrared light pen P. The CPU 22 accesses the input source (device) specified by the user and refers to data stored in the specified input source.

Having referred to the specified input source, the CPU 22 checks whether the data in the specified input source is a still image or motion images (step S3122). When the data in the specified input source is a still image (step S3122: YES), the CPU 22 reads the still image in the specified input source and stores the still image in the image storage unit 44 as the function of the still image acquisition unit 34 (step S3123). An image stored in the image storage unit 44 in the image input process is hereinafter also referred to as a candidate image. The CPU 22 then generates a thumbnail image of the candidate image stored in the image storage unit 44 and displays the image in the form of a thumbnail in the candidate image area SLF3 (step S3128).

On the other hand, when the data in the specified input source are motion images (step S3122: NO), the motion images in the specified input source are reproduced, that is, projected and displayed (step S3124). The motion images may be reproduced and displayed in the edited image area EDF3 or as displayed images dedicated for motion image reproduction. In the present embodiment, the motion images are reproduced and displayed as displayed images dedicated for motion image reproduction.

When the user operates the capture button 82 while the motion images are reproduced and displayed (step S3125: YES), the CPU 22 acquires a frame image in one of the motion images being reproduced and displayed, that is, a frame image in the motion image projected and displayed when the user operates the capture button 82 (step S3126) as the function of the frame image acquisition unit 36. When the user does not operate the capture button 82 while the motion images are being reproduced (step S3125: NO), the CPU 22 repeatedly reproduces the motion images. Alternatively, a first image of the motion images may be acquired as the frame image.

Having acquired the frame image, the CPU 22 stores the acquired frame image as a candidate image in the image storage unit 44 (step S3127). The CPU 22 then generates a thumbnail image of the candidate image stored in the image storage unit 44 and displays the thumbnail image in the form of a thumbnail in the candidate image area SLF3 (step S3128). The CPU 22 repeatedly carries out the processes in steps S3121 to S3128 until the user terminates the image input process (step S3129: NO). That is, when the user inputs a plurality of images as candidate images to the projector 20, the CPU 22 repeatedly carries out the processes in steps S3121 to S3128. In the present embodiment, the CPU 22 displays an image input process termination icon in the form of a displayed image at the same time when the image input process is initiated, and when the user operates the image input process termination icon, the CPU 22 terminates the image input process (step S3129: YES). In the present embodiment, a still image and a frame image acquired in the image input process are directly stored in the image storage unit 44, but these image may alternatively be temporarily stored in the RAM 45 and then stored in the image storage unit 44.

Figure 22:
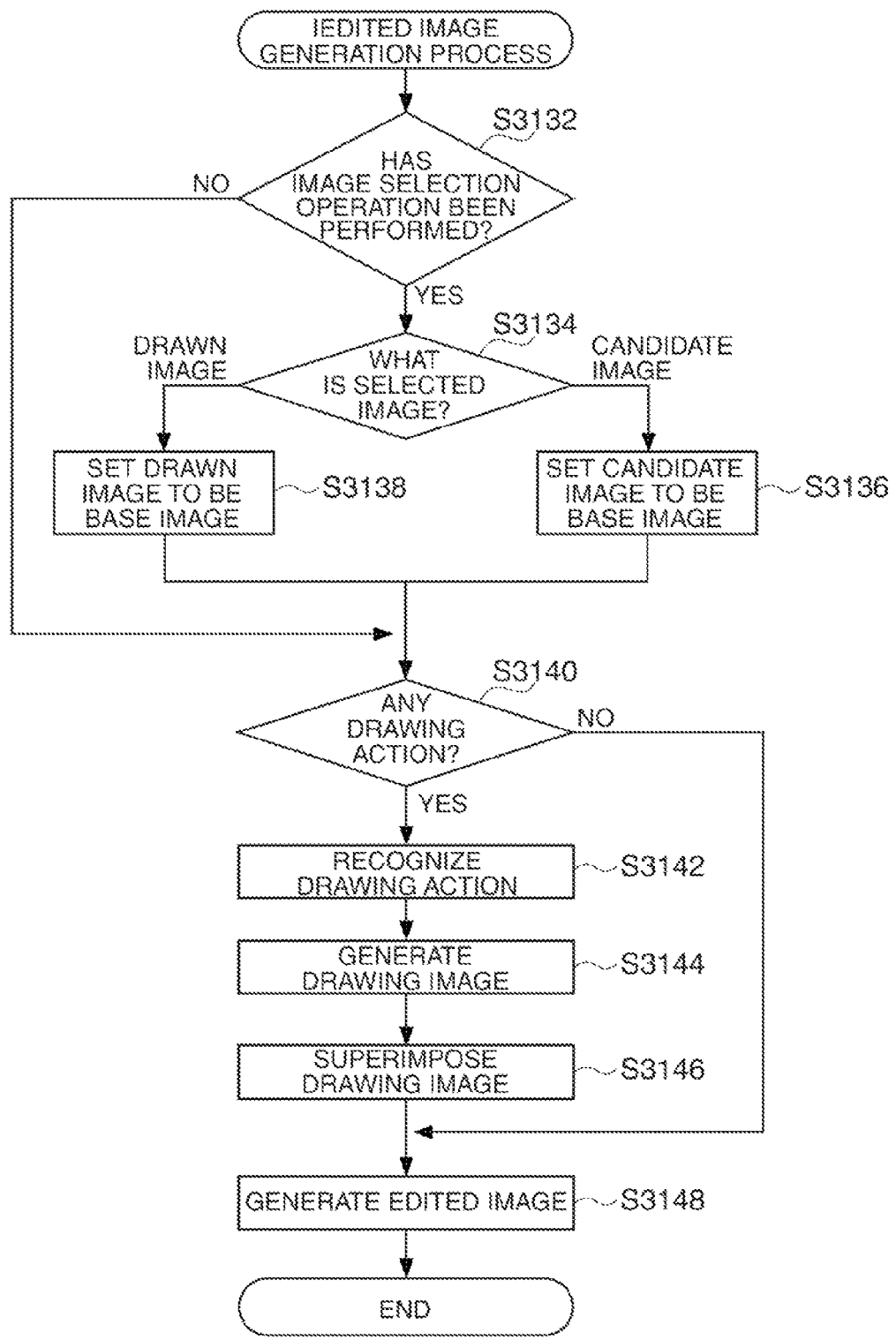
FIG. 22 is a flowchart showing the procedure of an edited image generation process in the third embodiment.

The edited image generation process (step S3130 in FIG. 20) carried out by the CPU 22 will next be described. FIG. 22 is a flowchart showing the procedure of the edited image generation process carried out by the CPU 22. Having initiated the edited image generation process, the CPU 22 checks whether or not the user has selected a candidate image from those displayed in the form of thumbnails in the candidate image area SLF3 or a drawn image from those displayed in the form of thumbnails in the drawn image area RSF3 with the infrared light pen P (image selection operation) (step S3132). The drawn images displayed in the form of thumbnails in the drawn image area RSF3 will be described in the description of an image storage process, which will be made later.

When the user has performed the image selection operation (step S3132: YES), and the selected image is a candidate image displayed in the candidate image area SLF3 (step S3134: CANDIDATE IMAGE), the CPU 22 reads the selected candidate image from the image storage unit 44 and sets the image to be the base image (step S3136). On the other hand, when the image selected by the user is a drawn image displayed in the drawn image area RSF3 (step S3134: DRAWN IMAGE), the CPU 22 reads the selected drawn image from the image storage unit 44 and sets the image to be the base image (step S3138). Further, when the user has not performed the image selection operation in step S3132 (step S3132: NO), the base image keeps being the white image set in step S3112 (FIG. 20).

The camera 54 then detects the infrared light emitted from the infrared light pen P, and the CPU 22 determines based on a result of the detection whether or not the user is performing a drawing action on the edited image area EDF3 on the screen SCR (step S3140). When the CPU 22 determines that the user is performing a drawing action (step S3140: YES), the CPU 22 recognizes the drawing action being performed by the user (step S3142). Specifically, the CPU 22 controls the camera 54 to capture images of the screen SCR and a portion in the vicinity thereof at predetermined intervals. Based on the captured image, the CPU 22 recognizes the path of the infrared light emitted from the infrared light pen P and converts the recognized path into coordinate data.

Having recognized the drawing action, the CPU 22 generates a drawing image based on the recognized drawing action as the function of the drawing image generation unit 26 (step S3144). Specifically, a line drawing is created based on the coordinate data produced from the path of the infrared light emitted from the infrared light pen P. In this process, when the user has selected a predetermined tool function in advance, a line drawing according to the tool function is created. For example, when the brush has been selected as the type of line drawing and red has been selected as the color of the line drawing, the CPU 22 generates a drawing image formed of a red line drawing drawn with the brush as the function of the tool control unit 30. Having generated the drawing image, the CPU 22 superimposes the drawing image on the base image having been set (step S3146) to generate an edited image (step S3148). On the other hand, when the user has performed no drawing action in step S3140 (step S3140: NO), the CPU 22 handles the base image having been set as en edited image (step S3148). Having thus generated the edited image, the CPU 22 terminates the edited image generation process.

Figure 23:
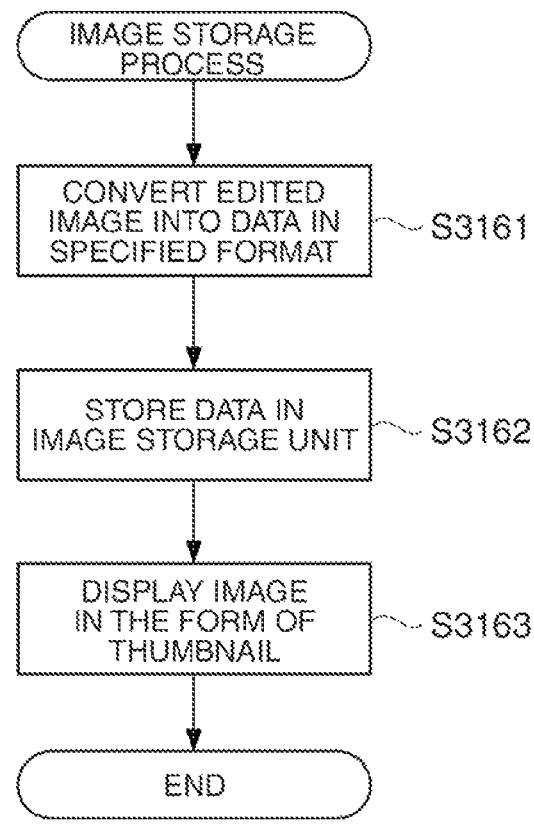
FIG. 23 is a flowchart showing the procedure of an image storage process in the third embodiment.

The image storage process (step S3160 in FIG. 20) will next be described. FIG. 23 is a flowchart showing the procedure of the image storage process carried out by the CPU 22. Having initiated the image storage process, the CPU 22 converts the edited image into data expressed in a data format specified by the user (hereinafter also referred to as specified format) (step S3161). The user specifies the data format, after the user operates the save button 86 and the CPU 22 projects and displays several data formats in the form of user-selectable displayed images, by selecting a desired data format with the infrared light pen P. Examples of the user-selectable data formats include PNG, PDF, JPEG, and a unique format re-editable by the projector 20 (hereinafter also referred to as unique format). A variety of data formats other than those described above may be employed. The user selects a data format from those described above. Having converted the edited image into data in the specified format, the CPU 22 saves the data as a drawn image in the image storage unit 44 (step S3162). The CPU 22 then displays the drawn image stored in the image storage unit 44 in the form of a thumbnail in the drawn image area RFS3 (step S3163) and terminates the image storage process.

The output control process (step S3170 in FIG. 20) will next be described. FIG. 24 is a flowchart showing the procedure of the output control process carried out by the CPU 22 as the function of the output control unit 40. Having initiated the output control process, the CPU 22 carries out a process according to user's operation of the print button 84 or the print icon, or the external storage icon or the mail transmission icon displayed in the tool display area TLF3 (step S3171).

When the user operates the print button 84 or the print icon (step S3171: PRINT), the CPU 22 converts the edited image into print data (step S3172). Specifically, the CPU 22 has a printer driver capability as the function of the output control unit 40 and converts the edited image into print data that can be printed with the printer PR connected to the projector 20. The printer driver relevant to the printer PR connected to the projector 20 may be provided as the function of the output control unit 40 in advance, may be acquired from the printer PR when the printer PR is connected to the projector 20, or may be acquired from a source external to the projector 20, for example, from an external storage device or over a LAN.

Having converted the edited image into print data, the CPU 22 outputs the print data to the printer PR (step S3173). The printing device receives the print data from the projector 20 and carries out a print process. The above description has been made with reference to the case where an edited image being edited is printed, but the projector 20 can alternatively read a candidate image or a drawn image stored in the image storage unit 44 in the image input process (FIG. 21) or the image storage process (FIG. 23) and print the candidate image or the drawn image. Specifically, when the user selects a candidate image or a drawn image from those displayed in the form of thumbnails in the candidate image area SLF3 or the drawn image area RSF3 with the infrared light pen P, the CPU 22 reads the candidate image or the drawn image from the image storage unit 44 and displays the image in the edited image area EDF3. Thereafter, when the user operates the print button 84, the CPU 22 carries out the processes in steps S3172 and S3173 to print the image.

Alternatively, when converting the edited image into print data, the CPU 22 may perform the data conversion in such a way that the base image and the drawing image can be visually distinguished from each other in a printed image produced in the print process. The base image and the drawing image can be visually distinguished from each other, for example, by drawing the contour of a line drawing that forms the drawing image with a broken line or a white line, coloring the drawing image with a single specific color, increasing or decreasing the chroma or brightness of the base image as compared with that of the drawing image, or using a variety of other methods.

Further, when converting the edited image into print data, the CPU 22 may list drawing images in a printed image produced in the print process in chronological order of user's drawing actions. To this end, the CPU 22 stores each generated drawing image and the time when the drawing image is generated in the EEPROM 42 with the drawing image and the generated time related to each other, and when the edited image is converted into the print data, the CPU 22 generates print data that lists the drawing images based on the time when they are generated. The CPU 22 can carry out the print process based on the edited image in the variety of methods described above. Printed images are useful for the user who wants to review what was discussed in a conference along time series.

When the user operates the external storage icon (step S3171: EXTERNAL STORAGE), the CPU 22 converts the generated edited image into data expressed in a format specified by the user (step S3174). The user specifies the data format, after the user operates the external storage icon and the CPU 22 projects and displays data formats in the form of user-selectable displayed images (dialog box, for example), by selecting a desired data format with the infrared light pen P. Examples of the user-selectable data formats include PNG, PDF, JPEG, and a unique format. A variety of data formats other than those described above may be employed.

Having converted the edited image into data expressed in the specified format, the CPU 22 outputs the converted data to the flash memory MR connected to the output IF 52 or the output IF 75 (step S3175). The flash memory MR receives the data outputted from the projector 20 and records the data. After the user selects a specified format, the CPU 22 projects and displays a dialog box as a displayed image and the user can select an area in the flash memory MR where the data is saved. Alternatively, a default save area may be set in advance.

Further, the projector 20 can read a candidate image or a drawn image stored in the image storage unit 44 in the image input process (FIG. 21) or the image storage process (FIG. 23) and record the read image in the flash memory MR. Specifically, the user uses the infrared light pen P to select a candidate image or a drawn image displayed in the form of a thumbnail in the candidate image area SLF3 or the drawn image area RSF3 and reads the image in the edited image area EDF3, and when the user operates the external storage icon, the CPU 22 carries out the processes in steps S3174 and S3175 described above to record the image.

Alternatively, a candidate image or a drawn image displayed in the form of a thumbnail in the candidate image area SLF3 or the drawn image area RSF3 may not be read into the edited image area EDF3 but may be outputted directly to the flash memory MR. In this case, the user selects one or more thumbnail displayed images corresponding to candidate images or drawn images that the user desires to store in the flash memory MR, and then the user operates the external storage icon to instruct the CPU 22 to read the selected candidate images or the drawn images, convert the read images into data expressed in a format specified by the user, and output the data to the flash memory MR. The purpose described above can thus be achieved by carrying out the process described above.

On the other hand, when the user operates the mail transmission icon (step S3171: MAIL TRANSMISSION), the CPU 22 converts the generated edited image into data expressed in a format specified by the user (step S3176), as in step S3174. The data on the edited data having undergone the data conversion is attached to a mail message (step S3177), and the mail message is transmitted via the server SV (step S3178).

Specifically, the CPU 22 has a mailer function as the function of the output control unit 40 and can attach the data on the edited image to a mail message and transmit the mail message. Mail addresses used as transmission destinations are displayed in the form of user-selectable displayed images after mail address data expressed in a specific data format (vCard®, for example) are externally acquired over a LAN or via the flash memory MR and a mailer is activated. The user selects a desired mail address with the infrared light pen P from one or more mail addresses displayed in the form of displayed images. An edited image attached to a mail message is not limited to the edited image being edited and may alternatively be an image specified by the user from the candidate images or the drawn images displayed in the form of thumbnails in the candidate image area SLF3 or the drawn image area RSF3. To this end, the CPU 22 reads the candidate image or the drawn image specified by the user in the candidate image area SLF3 or the drawn image area RSF3 from the image storage unit 44, converts the read image into data expressed in the specified format, and attaches the data to the mail message. The CPU 22 thus carries out the output control process.

As described above, the projector 20 according to the present embodiment is capable of externally inputting an image and storing the image in the image storage unit 44. Further, an image selected by the user from those stored in the image storage unit 44 can be displayed in the edited image area EDF3. Therefore, when image data brought by a plurality of users on an individual basis are projected and displayed for presentation, it is not necessary to switch an input source to another whenever an image projected and displayed is switched to another, combine all the image data into a single input source (computer PC, for example) before the image data are projected and displayed, or make any other cumbersome efforts. Further, the projector 20 can use an externally acquired still image or a frame image in externally acquired motion images as the base image, whereby it is not necessary to separately prepare the computer PC having the functions described above.

The projector 20 according to the present embodiment is capable of recognizing drawing and editing actions performed by the user on a projected, displayed base image, producing and editing a drawing image, generating an edited image by using the base image as a background image, and projecting and displaying the edited image in real time. The projector 20 is further capable of storing the edited image. The projector 20 is still further capable of directly outputting an image stored in the image storage unit 44 in the form of a printed image, image data, and an attachment to a mail message. An edited image generated by the user by using the projector 20 as a whiteboard can therefore be stored as it is in the image storage unit 44, and the stored edited image can be not only read, projected, and displayed but also distributed by carrying out the output control process. That is, an edited image recorded in the projector 20 can be shared by a plurality of users in a variety of forms. As a result, the user can use the stored edited image as a minute in which what was discussed is recorded. Further, the user can use the projector 20 as a whiteboard suitable in a conference without having to separately prepare a device having the functions described above (computer PC, for example) but with a relatively simple effort.

The projector 20, which carries out the activation control process shown in FIG. 18, allows the user to use the WB mode immediately after simple operation. Further, the projector 20, which automatically stores an edited image in the image storage unit 44 when the user has not saved the edited image before the user powers off the projector, can hold the edited image even when the user forgets saving the edited image and powers off the projector. The projector 20, which can be operated through the operation panel 70, can be readily operated even when the projector 20 is a wall-mounted projector as shown in FIG. 1.

D. Variations

The invention is not limited to the embodiments described above but can be implemented in a variety of other aspects to the extent that they do not depart from the substance of the invention. For example, the following variations are conceivable.

(D1) Variation 1

In the embodiments described above, the projector 20 and the operation panel 70 are wired to each other. Alternatively, they may be wirelessly connected to each other by using a wireless LAN, Bluetooth, or any other wireless technology. Further, a predetermined authentication method may be used before the connection between the projector 20 and the operation panel 70 is established. For example, when the projector 20 and the operation panel 70 are wired to each other, the body-side connection IF 58 and the panel-side connection IF 71 or the connection terminal 72 and the connection terminal 73 have a unique shape on a set basis, and the connection is established only when the paired components have the same shape. That is, the projector 20 that belongs to a certain set is not connected to the operation panel 70 that belongs to another set.

When the projector 20 and the operation panel 70 are wirelessly connected to each other, the body-side connection IF 58 and the panel-side connection IF 71 are configured to communicate with each other by using a unique signal on a set basis. That is, the body-side connection IF 58 that belongs to a certain set and the panel-side connection IF 71 that belongs to another set cannot communicate with each other or practically connected to each other.

Additionally, to connect the operation panel 70 to the projector 20 and establish communication with each other, a variety of authentication methods can be employed as follows: input of a secret number; fingerprint authentication; RFID-card-based authentication; and key-based authentication. The authentication methods described above can be practically implemented by providing a numeric keypad through which a secret number is inputted, a fingerprint authentication device, an RFRD reader, a key box, and other functional units according to the authentication methods provided in the operation panel 70 or the projector 20. Alternatively, the user may input a secret number into a projected, displayed numeric keypad image with the infrared light pen P.

Employing any of the configurations described above prevents a user who uses an operation panel that belongs to a projector of a certain model from operating another projector of the same model. For example, when the projector 20 has an edited image stored therein, and a rightful user of the projector 20 removes the operation panel 70 from the projector 20 and keeps the operation panel 70, another person cannot acquire the edited image recorded in the projector 20 by using an operation panel 70 different from the operation panel 70 paired with the projector 20. The edited image is thus securely stored.

(D2) Variation 2

In the embodiments described above, an edited image is stored when the projector 20 is powered off (step S1194→step S1196 in FIG. 6/step S2194→step S2196 in FIG. 13/step S3194→step S3196 in FIG. 20). Conversely, an edited image stored in the image storage unit 44 may be deleted when the projector 20 is powered off. In this way, the content of an edited image having been generated will not be revealed to another person who powers on the projector again. The edited image is thus securely protected.

(D3) Variation 3

In the embodiments described above, the projector 20 senses the infrared light emitted from the infrared light pen P to recognize a user's drawing action, but the projector 20 does not necessarily sense infrared light and may recognize a drawing action based on coordinate information acquired from a mouse, a tablet, or any other pointing device connected to the projector 20. A drawing action may still alternatively be recognized based on coordinate information acquired from an action recognition device that recognizes a user's action itself with a sensor and converts the recognized action into coordinate information. Still alternatively, a user's drawing action may be recognized by using a dedicated board that functions as the screen SCR. Specifically, consider a case where a dedicated board having a touch panel capability is connected to the projector 20. In this case, the drawing recognition unit 24 may acquire coordinate information corresponding to a user's drawing action performed on the dedicated board, and the drawing image generation unit 26 may generate a drawing image based on the acquired coordinate information. The same advantageous effects as those provided in the embodiments described above can therefore be provided.

(D4) Variation 4

In the embodiments described above, a wall-mounted, short-focal-length projector is employed as the projector 20. A mobile projector may alternatively be employed. In this case, since the relative positional relationship between the projector and the screen SCR may vary whenever they are installed, calibration by which the relative positional relationship is recognized is performed whenever the projector is powered on, whereby a drawing action performed with the infrared light pen P can be precisely recognized.

(D5) Variation 5

In the image projector system 10 in any of the embodiments described above, all the input/output devices connected to the input IF 50, the input IF 74, the output IF 52, and the output IF 75 are not necessarily connected thereto. Further, devices other than the input devices described in the above embodiments may be connected to the projector 20. For example, an overhead camera, a mobile phone (including smartphone), and a variety of other input/output devices may be connected to the projector 20.

The invention is not limited to the embodiments, examples, and variations described above but can be implemented in a variety of configurations to the extent that they do not depart from the substance of the invention. For example, the technical features in the embodiments, examples, and variations corresponding to the technical features in the aspect described in Summary can be replaced or combined as appropriate in such a way that part or all of the problems described above are solved or part or all of the advantageous effects described above are achieved. Further, any of the technical features can be deleted as appropriate unless it is not described as essential portions herein.

What is claimed is:

1. An image projector device comprising:
   a recognition unit that recognizes a user's action;
   a control unit that generates an image based on the user's action recognized by the recognition unit;
   a projection optical unit that projects and displays the image generated by the control unit;
   an image storage unit that stores the image generated by the control unit; and
   a display control unit that projects and displays, through the projection optical unit, a displayed image containing a first area where the stored one or more images are displayed in user-selectable forms, and a second area where a selected one of the images is displayed.

2. The image projector device according to claim 1, further comprising:
   an enclosure that accommodates at least the projection optical unit and the control unit,
   wherein the enclosure accommodates an image processing unit that edits the selected image,
   the display control unit displays an image being edited in the second area, and
   the image storage unit stores the image having been edited.

3. The image projector device according to claim 1, further comprising:
   an enclosure that accommodates at least the projection optical unit and the control unit,
   wherein the enclosure accommodates an output control unit that outputs an image stored in the image storage unit out of the image projector device.

4. The image projector device according to claim 3,
   wherein the output control unit outputs one or more images selected by the user from the stored images out of the image projector device.

5. The image projector device according to claim 3,
   wherein the output control unit outputs the stored images to at least one of a nonvolatile memory, a mail server, and a printing device.

6. The image projector device according to claim 1,
   wherein the image storage unit deletes the stored image when the image projector device is powered off.

7. The image projector device according to claim 1,
   wherein the image storage unit holds the stored image after the image projector device is powered off.

8. A method of controlling an image projector device comprising:
   recognizes a user's action in conjunction with the projector device;
   generates an image with a control unit based on the recognized user's action;
   projecting and displaying the image generated by the control unit with a projection optical unit;
   storing the image generated by the control unit in an image storage unit; and utilizing a display control unit to project and display, through the projection optical unit, a displayed image containing a first area where the stored one or more images are displayed in user-selectable forms, and a second area where a selected one of the images is displayed.

9. The method according to claim 8, wherein the projection optical unit, the control unit and an image processing unit that edits the selected image are accommodated in an enclosure,
   the method further comprising:
   displaying an image being edited in the second area with the display control unit; and
   storing the image having been edited in the image storage unit.

10. The method according to claim 8, wherein at least the projection optical unit and the control unit are accommodated in an enclosure, and
    an output control unit that outputs an image stored in the image storage unit out of the image projector device is accommodated in the enclosure.

11. The method according to claim 10, further comprising outputting one or more images selected by the user from the stored images out of the image projector device using the output control unit.

12. The method according to claim 10, further comprising outputting the stored images to at least one of a nonvolatile memory, a mail server, and a printing device using the output control unit.

13. The method according to claim 8, further comprising deleting the stored image when the image projector device is powered off using the image storage unit.

14. The method according to claim 8, further comprising holding the stored image after the image projector device is powered off using the image storage unit.

* * * * *